United States Patent
Currivan et al.

(10) Patent No.: US 10,009,191 B2
(45) Date of Patent: *Jun. 26, 2018

(54) COMMUNICATION SYSTEM WITH PROACTIVE NETWORK MAINTENANCE AND METHODS FOR USE THEREWITH

(71) Applicant: BROADCOM CORPORATION, Irvine, CA (US)

(72) Inventors: Bruce Joseph Currivan, Los Altos, CA (US); Richard Stephen Prodan, Niwot, CO (US); Thomas Joseph Kolze, Phoenix, AZ (US); Hanli Zou, Rancho Santa Margarita, CA (US); Ramon Alejandro Gomez, San Juan Capistrano, CA (US); Leo Montreuil, Atlanta, GA (US); Mark Edward Laubach, Redwood City, CA (US); Roger Wayne Fish, Superior, CO (US); Lisa Voigt Denney, Suwanee, GA (US); Niki Roberta Pantelias, Duluth, GA (US); Jonathan Sooki Min, Newport Coast, CA (US)

(73) Assignee: AVAGO TECHNOLOGIES GENERAL IP (SINGAPORE) PTE. LTD, Singapore (SG)

(*) Notice: Subject to any disclaimer, the term of this patent is extended or adjusted under 35 U.S.C. 154(b) by 0 days. days.

This patent is subject to a terminal disclaimer.

(21) Appl. No.: 15/349,685

(22) Filed: Nov. 11, 2016

(65) Prior Publication Data

US 2017/0063569 A1    Mar. 2, 2017

Related U.S. Application Data

(63) Continuation of application No. 14/978,868, filed on Dec. 22, 2015, now Pat. No. 9,531,562, which is a
(Continued)

(51) Int. Cl.
*H04L 12/28* (2006.01)
*H04B 3/46* (2015.01)
(Continued)

(52) U.S. Cl.
CPC .......... *H04L 12/2885* (2013.01); *H04B 3/46* (2013.01); *H04L 5/0007* (2013.01);
(Continued)

(58) Field of Classification Search
CPC . H04L 5/0007; H04L 5/0048; H04L 25/0226; H04L 27/2605; H04L 27/2613;
(Continued)

(56) References Cited

U.S. PATENT DOCUMENTS 9,531,562 B2 * 12/2016 Currivan .................. H04B 3/46
2014/0133330 A1 *  5/2014 Chapman ............ H04L 41/0806
370/252
(Continued)

FOREIGN PATENT DOCUMENTS

CN        1490951 A       4/2004
CN      101325571 A      12/2008
(Continued)

OTHER PUBLICATIONS

Chinese Patent Office, 2nd rejection notice for CN104079519, dated Jul. 6, 2017.*
(Continued)

*Primary Examiner* — Benjamin H Elliott, IV
(74) *Attorney, Agent, or Firm* — Garlick & Markison; Bruce E. Stuckman

(57) ABSTRACT

A transmitter for use in a cable modem termination system includes a data processing module that generates a plurality of OFDM symbols from a data packet. A probe symbol generator generates a probe symbol, as one of a plurality of probe symbol types. The probe symbol is selectively
(Continued)

inserted within the plurality of OFDM symbols, at a predefined probe symbol interval.

20 Claims, 14 Drawing Sheets

Related U.S. Application Data continuation of application No. 14/215,619, filed on Mar. 17, 2014, now Pat. No. 9,264,101.

(60) Provisional application No. 61/806,274, filed on Mar. 28, 2013, provisional application No. 61/949,098, filed on Mar. 6, 2014, provisional application No. 61/810,064, filed on Apr. 9, 2013, provisional application No. 61/823,747, filed on May 15, 2013, provisional application No. 61/859,370, filed on Jul. 29, 2013, provisional application No. 61/862,907, filed on Aug. 6, 2013, provisional application No. 61/898,048, filed on Oct. 31, 2013.

(51) Int. Cl.
*H04L 27/26* (2006.01)
*H04L 5/00* (2006.01)
*H04L 25/02* (2006.01)

(52) U.S. Cl.
CPC ........ *H04L 5/0048* (2013.01); *H04L 25/0226* (2013.01); *H04L 27/2605* (2013.01); *H04L 27/2613* (2013.01)

(58) Field of Classification Search
CPC ............... H04L 27/2601; H04L 27/261; H04L 27/2666; H04L 27/2675; H04B 3/46; H04B 5/0018; H04B 17/00; H04B 5/0007; H04B 5/0048
See application file for complete search history.

(56) References Cited

U.S. PATENT DOCUMENTS

2014/0254407 A1* 9/2014 Williams .............. H04W 24/06
370/252
2017/0063569 A1* 3/2017 Currivan .................. H04B 3/46

FOREIGN PATENT DOCUMENTS

| CN | 102361465 A | 2/2012 |
|---|---|---|
| WO | 2012016353 A | 2/2012 |

OTHER PUBLICATIONS

State Intellectual Property Office; Office Action; CN Application No. 201410124551.9; dated Nov. 22, 2016; 9 pgs.

\* cited by examiner

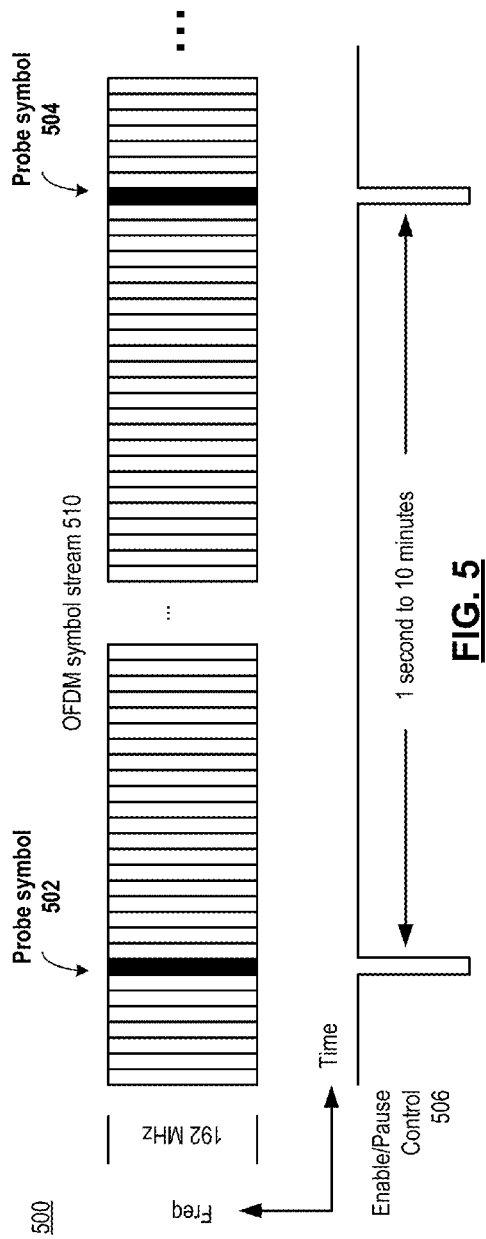
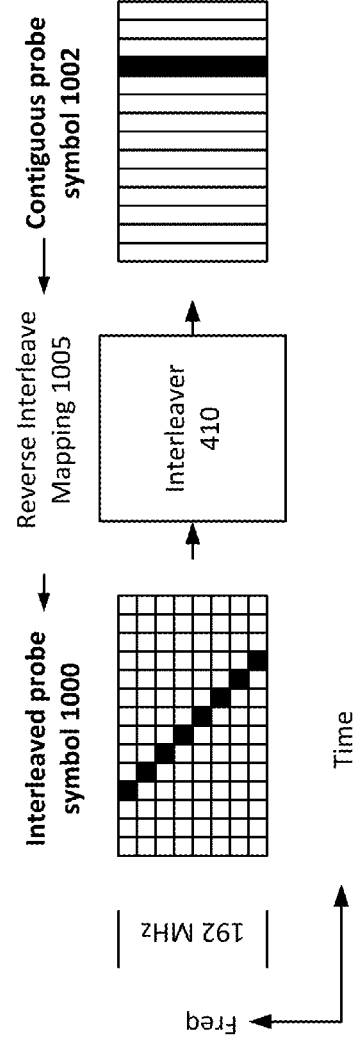

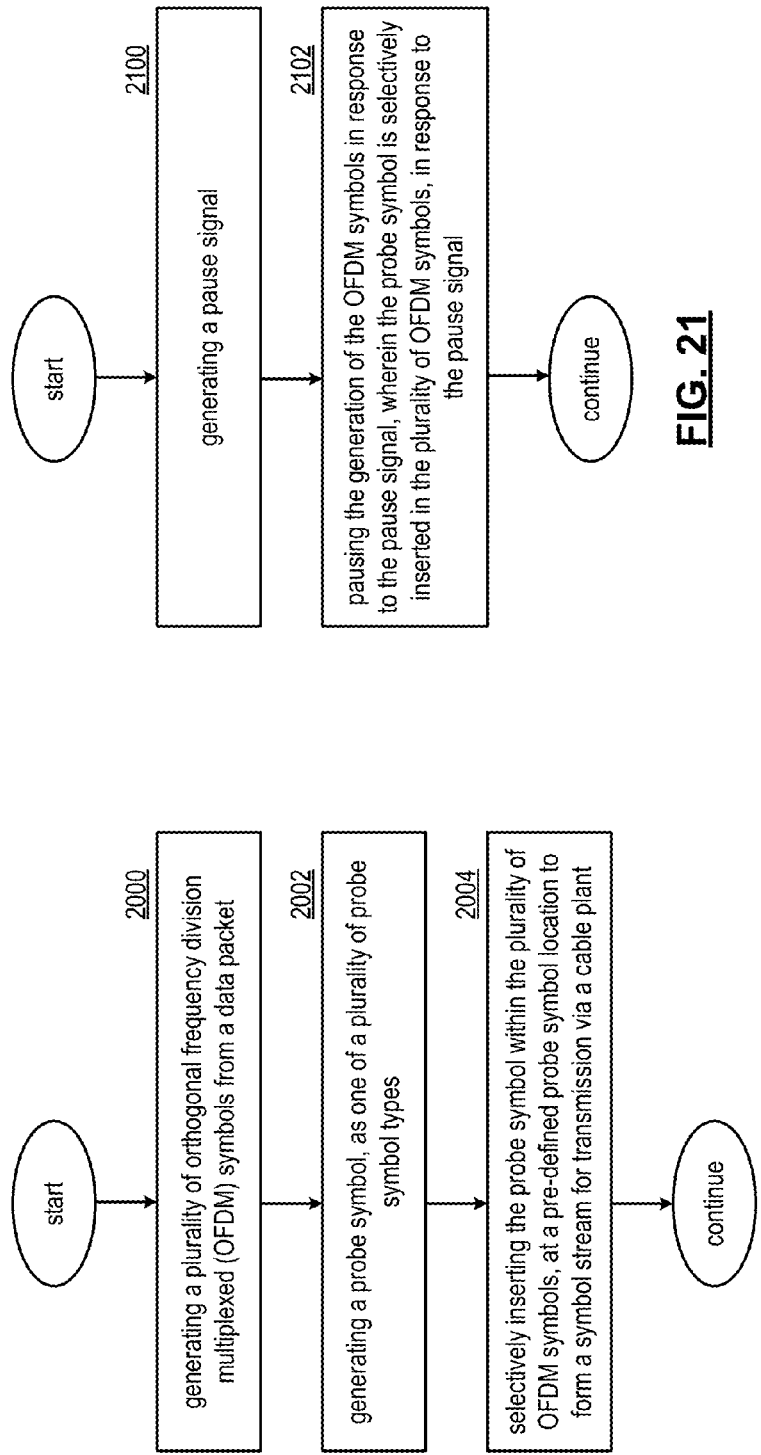

COMMUNICATION SYSTEM WITH PROACTIVE NETWORK MAINTENANCE AND METHODS FOR USE THEREWITH

CROSS REFERENCE TO RELATED PATENTS/PATENT APPLICATIONS

The present U.S. Utility patent application claims priority pursuant to 35 U.S.C. § 120 as a continuation of U.S. Utility application Ser. No. 14/978,868, entitled "COMMUNICATION SYSTEM WITH PROACTIVE NETWORK MAINTENANCE AND METHODS FOR USE THEREWITH", filed Dec. 22, 2015, which is a continuation of U.S. Utility application Ser. No. 14/215,619, entitled "COMMUNICATION SYSTEM WITH PROACTIVE NETWORK MAINTENANCE AND METHODS FOR USE THEREWITH", filed Mar. 17, 2014, issued as U.S. Pat. No. 9,264,101 on Feb. 16, 2016, which claims priority pursuant to 35 U.S.C. § 119(e) to U.S. Provisional Application No. 61/806,274, entitled "COMMUNICATION SYSTEM WITH PROBE SYMBOL TRANSMISSIONS", filed Mar. 28, 2013; U.S. Provisional Application No. 61/810,064, entitled "COMMUNICATION SYSTEM WITH PROBE SYMBOL TRANSMISSIONS FOR LEAKAGE LOCATION", filed Apr. 9, 2013; U.S. Provisional Application No. 61/823,747, entitled "COMMUNICATION SYSTEM WITH PROBE SYMBOL TRANSMISSIONS OF DIFFERING TYPES", filed May 15, 2013; U.S. Provisional Application No. 61/859,370, entitled "COMMUNICATION SYSTEM WITH CARRIER WAVE SYMBOL TRANSMISSIONS FOR LEAKAGE DETECTION", filed Jul. 29, 2013; U.S. Provisional Application No. 61/862,907, entitled "COMMUNICATION SYSTEM WITH CARRIER WAVE TRANSMISSIONS FOR EGRESS MONITORING, PHASE NOISE TESTING AND/OR MEASUREMENT OF SUBCARRIER SPACING", filed Aug. 6, 2013; U.S. Provisional Application No. 61/898,048, entitled "COMMUNICATION SYSTEM WITH PROACTIVE NETWORK MAINTENANCE", filed Oct. 31, 2013; and U.S. Provisional Application No. 61/949,098, entitled "COMMUNICATION SYSTEM WITH PROACTIVE NETWORK MAINTENANCE AND METHODS FOR USE THEREWITH", filed Mar. 6, 2014; all of which are hereby incorporated herein by reference in their entirety and made part of the present U.S. Utility patent application for all purposes.

BACKGROUND

Technical Field

The disclosure relates generally to communication systems; and, more particularly, it relates to point-to-multipoint communication systems such as cable modem systems.

Description of Related Art

In conventional point-to-multipoint communication systems, a network supports bidirectional data communication between a central entity and multiple customer premises equipment (CPE). Example point-to-multipoint communication systems include cable modem systems, fixed wireless systems, and satellite communication systems. In each system, the communication path from the central entity to the CPE is typically referred to as the downstream, while the communication path from the CPE to the central entity is typically referred to as the upstream.

One type of point-to-multipoint system is a cable modem system, which typically includes a headend that is capable of communicating with multiple CPEs, each of which provides cable modem functionality. In a cable modem system, the CPE can be a cable modem, a set top box, or a cable gateway, to provide some examples.

DOCSIS (Data Over Cable Service Interface Specification) refers to a group of specifications published by CableLabs that define industry standards for cable headend and cable modem equipment. In part, DOCSIS sets forth requirements and objectives for various aspects of cable modem systems including operations support systems, management, data interfaces, as well as network layer, data link layer, and physical layer transport for data over cable systems. One version of the DOCSIS specification is version 2.0, and includes the DOCSIS Radio Frequency Interface (RFI) Specification SP-RFIv2.0-I03-021218 (hereinafter "DOCSIS RFI Specification"), the entirety of which is incorporated by reference herein.

DOCSIS 2.0 supports the ITU-T J.83 B (hereinafter "Annex B") standard for downstream physical (PHY) layer transmissions from the headend to cable modems. Advances in communication technology are requiring increasingly more bandwidth, which can lead to deficiencies in channel capacity, especially with respect to these downstream transmissions. For example, even cable plants operating at a frequency of 750 MHz are being challenged with capacity shortages, due to increased demand for video on demand (VOD), high-definition television (HDTV), digital services, and expanding analog channel lineups. Numerous schemes have been proposed to help alleviate the downstream bandwidth issues, including analog spectrum reclamation and advanced video coding techniques. A DOCSIS 3.0 specification with channel bonding support has been in use for several years and a DOCSIS 3.1 proposal has been circulated.

BRIEF DESCRIPTION OF THE SEVERAL VIEWS OF THE DRAWINGS

FIG. 5 illustrates an embodiment 500 of an OFDM symbol stream with probe symbol insertion.

FIG. 10 illustrates an embodiment 1000 of an OFDM symbol stream with probe symbol insertion.

FIG. 20 illustrates an embodiment of a method.

FIG. 21 illustrates an embodiment of a method.

DETAILED DESCRIPTION

Figure 1:
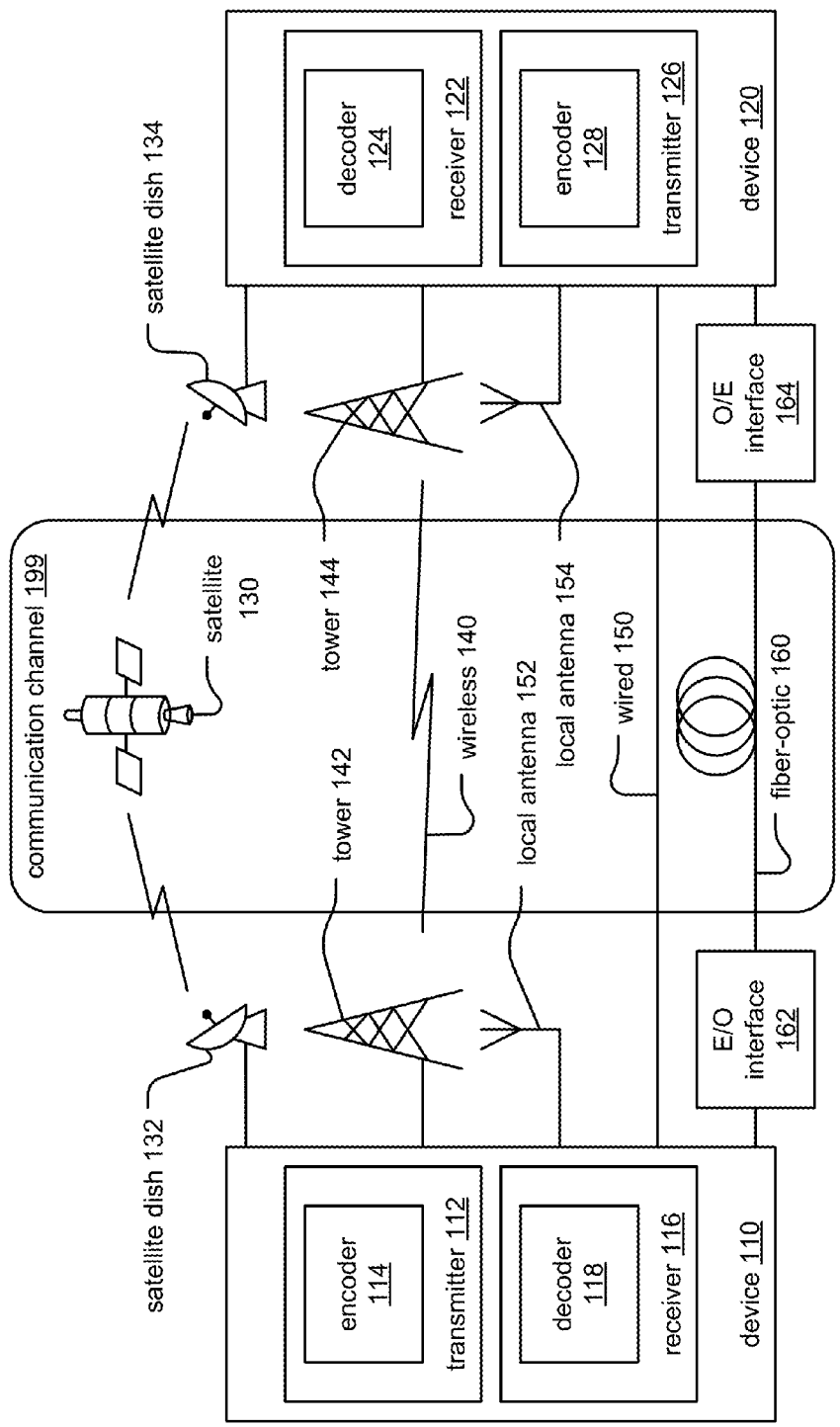
FIG. 1 illustrates an embodiment 100 of a communication system.

FIG. 1 illustrates an embodiment 100 of a communication system. In particular, communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. The respective devices 110 and 120 are operative to send and/or receive probe symbol transmissions for the purposes of determining the characteristics of the channel 199, determining plant leakage and for performing other functions including proactive network maintenance and optimization.

In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennas 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the disclosure. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120. Any of the various types of coding described herein can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Figure 2:
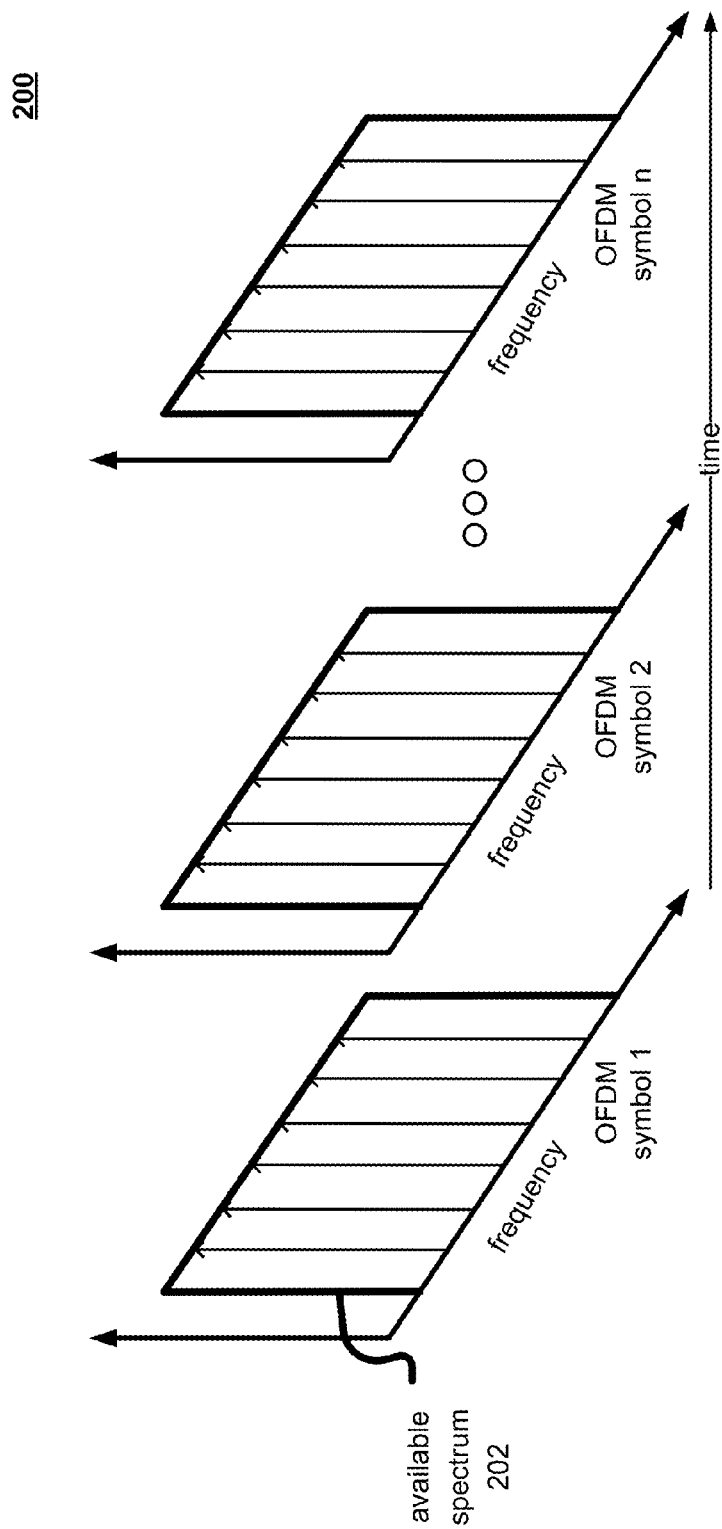
FIG. 2 illustrates an embodiment 200 of OFDM (Orthogonal Frequency Division Multiplexing).

FIG. 2 illustrates an embodiment 200 of OFDM (Orthogonal Frequency Division Multiplexing). In particular, an OFDM modulation scheme is presented for use in conjunction with transmissions over communication channel 199 via devices 110 and 120. OFDM modulation may be viewed a dividing up an available spectrum 202 into a plurality of narrowband sub-carriers (e.g., lower data rate carriers). Typically, the frequency responses of these sub-carriers are overlapping and orthogonal. Each sub-carrier may be modulated using any of a variety of modulation coding techniques.

OFDM modulation operates by performing simultaneous transmission of a larger number of narrowband carriers (or multi-tones). Oftentimes a guard interval (GI) or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols. Generally speaking, OFDM system design is based on the expected delay spread within the communication system (e.g., the expected delay spread of the communication channel).

Figure 3:
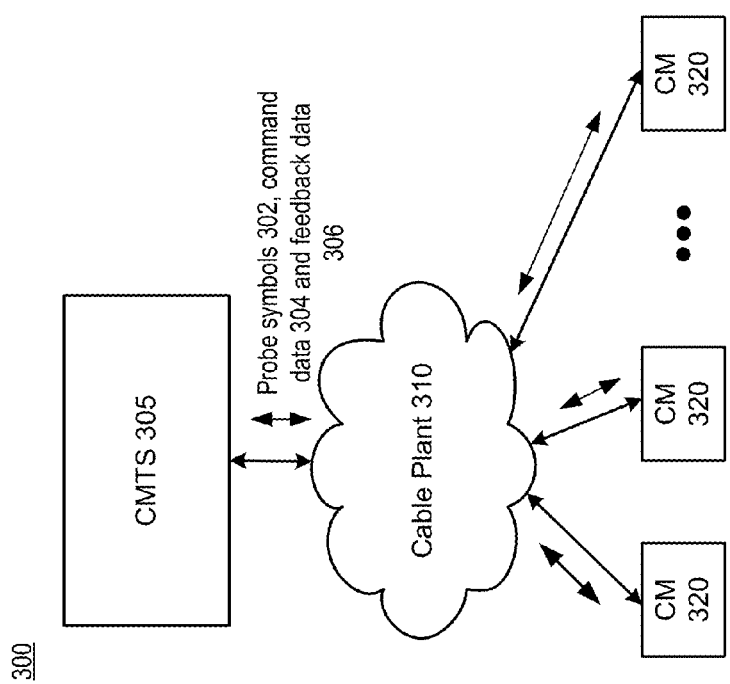
FIG. 3 illustrates an embodiment 300 of a communication system.

FIG. 3 illustrates an embodiment 300 of a communication system. A particular embodiment of communication system 100 is presented as a cable system 300 that provides bidirectional communication between a CMTS (cable modem termination system) 305 and a plurality of cable modems 320 via a cable plant 310—specific examples of the devices 110, 120 and channel 199 presented in conjunction with FIG. 1. In this embodiment, the CMTS 305 and cable modems 320 operate in accordance with a DOCSIS protocol or other cable modem protocol that employs OFDM modulation on the downstream link from the CMTS 305 and the cable modems 320 and further the upstream link from the cable modems 320 to the CMTS 305.

As discussed in conjunction with FIG. 3, the CMTS 305 and cable modems 320 are operative to send and/or receive probe symbol transmissions that include probe symbols 302 that are sent for the purposes of determining the characteristics of the cable plant 310, performing network maintenance and optimization, other purposes, etc. In particular, while current DOCSIS 2.0/3.0 provides for quiet time in upstream during which the noise floor is measured, in an embodiment, quiet probe symbols are inserted in the upstream and/or downstream transmissions to provide sensitive measurements of quantities such as thermal noise, ingress, CPD (common path distortion), CSO (composite second order), CTB (composite triple beat), products from laser and amplifier clipping, ringing of previous OFDM symbol into the quiet time, including echoes past the length of the cyclic prefix, and optionally other measurements. In the addition or in the alternative, active probe symbols can be inserted in either the upstream or downstream transmissions to characterize the transfer function of cable plant 310. In particular, the active probe symbols can be used to determine a complex frequency response (amplitude and group delay), nonlinear response including amplifier compression, laser clipping, diode rectification effects, nonlinearities via histogram techniques, as well as other characteristics of the cable plant 310 and/or characteristics of the individual transmitters and receivers of CMTS 305 and each of the cable modems 320.

In an embodiment, actual data-carrying symbols may be used to fulfill the function of active probe symbols 302. For this to be most effective, the contents of the data-carrying symbols are captured at the transmitter so that they may be compared with the received samples to characterize the transfer function of cable plant 310. Such a data symbol having known content, and used as a probe symbol 302, can be referred to herein as a probe symbol. In all cases where a probe symbol is described herein, an actual data symbol can be used for this purpose.

In addition, the CMTS 305 and cable modems 320 are operative to send and/or receive command data 304 and feedback data 306 related to commands for analysis to be performed, and the results of the analysis including, for example, MIB (management information base) data and other data and commands.

This disclosure includes various embodiments for use with such as a system 300. For example, a transmitter includes a data processing module that generates a plurality of OFDM symbols from a data packet. A probe symbol generator generates a probe symbol 302, as one of a plurality of probe symbol types. The probe symbol 302 is selectively inserted within the plurality of OFDM symbols, at a pre-defined probe symbol interval. The probe symbol may be a data symbol, in which case no special probe insertion is needed, since a normal data-carrying symbol is used to fulfill the function of an active probe symbol. Rather, the contents of the data symbol are captured at the transmitter for later comparison with the received samples, which are also captured at the receiver. Synchronization is required to ensure that the same symbol is captured at the transmitter and receiver. Such synchronization may be provided by a trigger message as described in conjunction with FIG. 12.

In another example, a network analyzer is configured to communicate proactive network maintenance data with a cable modem 320 and the CMTS 305 to provide proactive network maintenance functions that include test and measurement of upstream and downstream parameters via probe symbol transmissions.

In a further example, a CMTS 305 or a cable modem 320 includes a transmitter that generates a plurality of OFDM symbols for transmission via the cable plant 310, wherein the plurality of OFDM symbols includes at least one pilot tone for cable plant leakage detection, phase noise testing, the detection of sub-carrier spacing and/or other test and measurement purposes.

In yet another example, a transmitter for use in a CMTS 305 generates a plurality of OFDM symbols for transmission via the cable plant, wherein the plurality of OFDM symbols includes at least one pilot tone for locating leakage in a cable plant 310 associated with the CMTS 305, wherein the at least one pilot tone is a carrier wave pilot that is phase continuous over the plurality of OFDM symbols.

In yet another example, a transmitter for use in a CMTS 305 includes a probe symbol generator that generates a probe symbol 302 for locating leakage in a cable plant 310 associated with the CMTS 305. A multiplexer selectively multiplexes a plurality of OFDM symbols for transmission via the cable plant 310.

In yet another example, a transmitter for use in a CMTS 305 includes a data processing module that generates a plurality of OFDM symbols from a data packet, wherein the data processing module pauses the generation of the OFDM symbols in response to a pause signal. A probe symbol generator generates a probe symbol 302. A pause control generator generates a pause signal. A multiplexer selectively multiplexes the probe symbol 302 with the plurality of OFDM symbols, in response to the pause signal.

Further examples regarding the transmission, reception and analysis of such probe symbols 302, command data 304 and feedback data 306 including several optional functions and features are described in conjunction with FIGS. 4-21 that follow.

Figure 4:
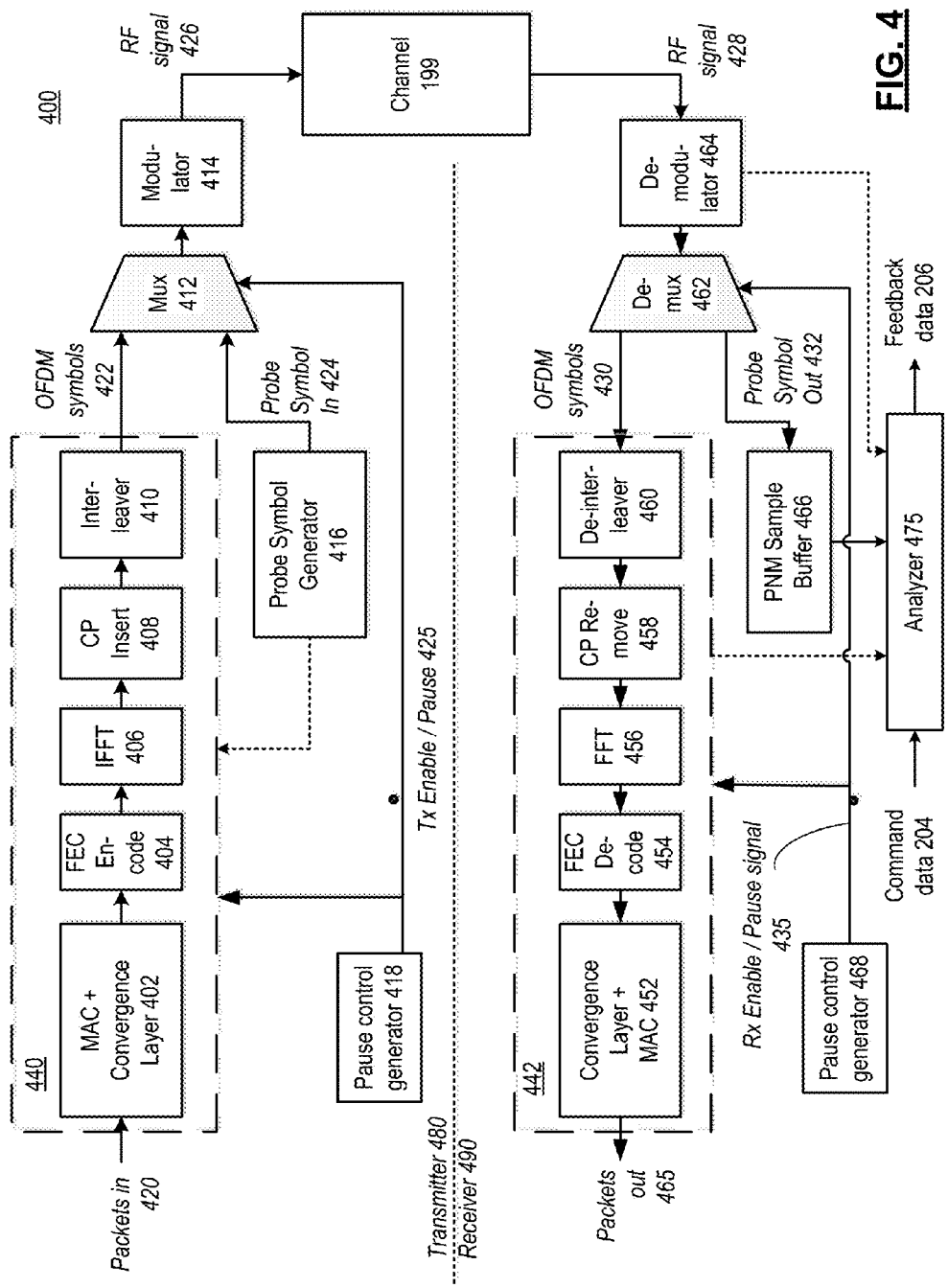
FIG. 4 illustrates an embodiment 400 of a transmitter and receiver operative to perform transmission of a signal.

FIG. 4 illustrates an embodiment 400 of a transmitter and receiver operative to perform transmission of a signal. In particular, a transmitter 480/receiver 490 pair are presented for use in conjunction with devices 110 and 120 in conjunction with communication channel 199, or more specifically a CMTS 305 and cable modem 320 communicating via cable plant 310 implementation of communication channel 199 or other communication system communicating via OFDM symbols. Input packets 420 (that can include command data 304 and other data) are processed by baseband processor or other data processing element such as baseband processor 440 to generate a plurality of OFDM symbols. As shown, the baseband processor 440 includes functional modules that implement MAC and convergence layer 402, FEC (forward error correction) encoding 404, IFFT (inverse Fast Fourier transform) 406, cyclic prefix insertion 408, and interleaver 410. The OFDM symbols 422 are selectively multiplexed with probe symbol inputs 424 (such as probe symbols 302) from probe symbol generator 416. In a particular embodiment, a pause control generator 418 generates a transmit enable/pause signal 425 that operates to pause the generation of non-probe OFDM symbols 422 by baseband processor 440 and to selectively insert probe symbol inputs 424 into the OFDM output of multiplexer 412. This OFDM symbol stream is modulated and amplified via modulator 414 into an RF signal 426 for introduction onto the cable plant 310. In addition or in the alternative, probe symbol inputs are otherwise input to one of more of the modules of a data processing element such as baseband processor 440, such as MAC and convergence layer 402, FEC (forward error correction) encoding 404, IFFT (inverse Fast Fourier transform) 406, cyclic prefix insertion 408, and interleaver 410 or other module not specifically shown.

At the receiver 490, the RF signal 428 generated by RF signal 426 via transmission through the communication channel 199, is amplified and demodulated via demodulator 464 and demultiplexed 462 to separate the OFDM symbols 430 from the probe symbol outputs 432. The OFDM symbols 430 are processed by baseband processor 442 into output packets 465 that can include recovered command data 204. As shown, the baseband processor or other data processing element such as baseband processor 442 includes functional modules that implement MAC and convergence layer 452, FEC (forward error correction) decoding 454, FFT (Fast Fourier transform) 456, cyclic prefix removal 458, and de-interleaver 460. The OFDM symbols 430 are selectively demultiplexed from the probe symbol outputs 432.

In a particular embodiment, a pause control generator 468, synchronized with pause control generator 418 based on a common timing scheme, generates a transmit enable/pause signal 435 that operates to pause the reception of OFDM symbols 430 by baseband processor 442 and to selectively route probe symbol outputs 432 into the PNM (proactive network management) sample buffer 466 for further processing by an analyzer 475 such as a PNM server or other processor that operates under control of the command data 204 to analyze the probe symbol outputs to generate feedback data 306 that, as previously discussed, characterizes the cable plant 310 and/or provides other metrics. In addition or in the alternative, the analyzer 475 operates based on other data from the demodulator 464, one or more modules from the data processor such as baseband processor 442 and/or other portions of the receiver 490 and generates feedback data 306 based on the probe symbol transmissions or other metrics that, as previously discussed, characterize the cable plant 310 or other communication channel 199 and/or provides other control and management information.

The feedback data 306 can be retransmitted via cable plant 310 or other communication channel 199 from a transmitter associated with receiver 490 to a receiver associated with transmitter 480. In this fashion, a CMTS 305, can send probe symbols 302 and command data 304 to a plurality of CMs 320 and receive feedback data 306 that is, in whole or in part, based on the probe symbol transmissions. In another mode of operation, a CM 320 can send probe symbols 302 and command data 304 to a CMTS 305 and receive feedback data 306 that is, in whole or in part, based on the probe symbol transmissions.

The optional use of the transmit and receive enable/pause signals 425 and 435 on the data processing elements allow existing functional blocks to be implemented with minimal changes. In operation, the data processing can be paused so the system will almost not know the pause occurred. For example, such as pause does not require flushing of the interleaver since the interleaving process is paused as well. The only processes of the baseband processors 440 and 442 that care about the pause are those that depend on real time, such as time interpolation across pilots, smoothing buffers, etc. The latency impact of such a system can be minimal (for example, on the order of only 40-80 microseconds. The transmit and receive enable/pause signals 425 and 435 can be periodic signals to simplify synchronization. For example, the pause function can have a period of 1 second to 10 minutes, or be turned off if not needed. In particular, a shorter period, such as 1 second can be employed for rapid data acquisition when in a troubleshooting mode of operation when troubleshooting a node. A longer time period such as 10 minutes can be employed in a normal mode of operation where background data logging is enabled.

The baseband processors 440 and 442 and the analyzer 475 can each be implemented via a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The pause control generators 418 and 468 can each be implemented via a timer, counter or other circuitry that generates a corresponding transmit enable/pause signal 425 and receive enable/pause signal 435.

As discussed above, a channel estimation block analyzes the samples of the probe symbol outputs to, as previously discussed, characterize that cable plant 310 or other communication channel 199 and/or provide other metrics. Examples of channel characterization techniques and the generation of probe symbols 302 to support such techniques are provided below.

Example 1—Pilot Estimation

The technique operates by subtracting the values of scattered pilots using a smoothed channel estimate. The result is an estimate of the noise floor at the pilot frequency, which moves across the whole band. The noise floor includes random noise and spurs. This can give performance 5-10 dB better than the required QAM SNR, e.g., over 40 dB. While this method is available in other receiver designs, as an enhancement, it can be used even in a broken channel, when only the PLC (Physical layer link channel) can be received by the CM 320. The CM 320 can have to report the measurements via the upstream through the broken plant condition as well. This can allow troubleshooting of broken plants.

In this example, the noise estimation works as follows. The received symbol on a scattered pilot bin is $Y=H*X+N$, where H is the channel response on scattered pilot (SP), X is the transmitted SP symbol, N is the noise, all in frequency domain. If the receiver channel estimation H(ce) is sufficiently filtered, then $N(est)=Y-H(ce)*X$, N(est) is the noise estimation on that pilot location. The noise power can be averaged over time to achieve better accuracy. N(est) includes receiver self-noise, spurs, implementation loss etc. The scattered pilot locations can rotate through all bins. In this fashion, a noise estimation can be generated for all bins in normal reception over time. Discrete CTB/CSO can also be easily detected if large noise power is seen at the known CTB/CSO frequencies.

Example 2—Silent Pilot Probe

At the narrowband extreme, sweep a single tone or a few tones, with zero modulation, across the band. This is like having additional scattered pilots with zero (silent or null) modulation. This approach can cause minimal disruption to an existing system design. This can provide better performance than using the existing pilots in Example 1 since the channel estimate is not needed to subtract the pilot values, since the pilot values are zero. Considering a DOCSIS 3.1 implementation, the time and frequency interleaver 410 can place nulled input sub-carriers on randomized subcarrier locations across a number of frequencies and across a number of OFDM symbols equal to the interleaver depth. So, rather than sweeping, the interleaver 410 provides nulled subcarrier measurements at a randomized (but complete) set of subcarriers across multiple transmitted symbols.

Example 3—Wideband (WB) Silent Probe

At the wideband extreme, pause downstream OFDM symbol stream every 1 second to 10 minutes and insert a quiet symbol across the entire 192 MHz band. This can be the most sensitive measurement but can require modifications in the PHY and MAC design. An example of this approach is presented in conjunction with FIG. 5.

Example 4—Noise Power Ratio (NPR) Probe

In this approach, less than the full band can be silenced. For example, a narrow band such as 6 MHz of contiguous tones can be silenced. This generates a notch that can be swept across the full band. The notch can fill with intermodulation products if nonlinearities were present in the plant. A challenge can be how to discriminate between the plant noise floor and the intermodulation products. However, making the notch wider can help see the intermodulation products. An inverse nonlinearity in the receiver can be adjusted until the notch is maximally open, possibly using the LMS algorithm to do the adjustment. Histogram techniques are valuable for estimating nonlinearity of plant. This NPR method can aid with the estimating. An example of this approach is presented in conjunction with FIG. 9.

Example 5—Data-Carrying Probe Symbols

As discussed in conjunction with FIG. 3, actual data-carrying symbols may be used to fulfill the function of active probe symbols 302. In particular, any type of data symbol can be used for this purpose. For this to be most effective, the contents of the data-carrying symbols are captured at the transmitter so that they may be compared with the received samples to characterize the transfer function of cable plant 310 or support other proactive network management functions as described herein. When the probe symbol is a data symbol, no special probe insertion is needed. Rather, the contents of the data symbol are captured at the transmitter for later comparison with the received samples, which are also captured at the receiver. Synchronization is required to ensure that the same symbol is captured at the transmitter and receiver. Such synchronization may be provided by a trigger message as described in conjunction with FIG. 12.

Example 6—Reverse Interleaver Approach

In this example a silent (wideband or narrowband) probe is inserted. In particular, null QAM values are inserted at the input to the interleaver. These values are scattered in a specific "reverse interleaved" pattern such that the interleaving function can re-group them into contiguous tones across a single OFDM symbol. In response to the transmit enable/pause signal 425, the blocks feeding the interleaver can know that these QAM slots were not available, and not insert data values into them. This can avoid the issue of pausing MAC and TC blocks, as the opportunities can be scattered in the normal data flow, rather than grouped. The PHY can still see a missing symbol or portion of a symbol. A state machine associated with the processing module such as baseband processor 440 can be used to do the reverse interleaving mapping and associated control.

In an embodiment, the interleaver 410 includes a convolutional interleaver for subcarriers in successive OFDM symbols, hence interleaving is continuous with no block boundaries to "pause" between interleaver blocks. However it is possible to "pre-interleave" using the fact that for an interleave depth of N the adjacent subcarriers in an OFDM symbol are successively delayed by one symbol up to N successive subcarriers and then reset and repeated (modulo N) until the end of the OFDM symbol. This approach can pre-interleave the null subcarriers across N successive OFDM symbols in the reverse interleaving pattern. In this fashion, all the null subcarriers are generated at the output of the time interleaver in the same OFDM symbol entering the channel (that is a single symbol with all null subcarriers). A subsequent frequency interleaver can randomize the subcarrier order in that symbol but that is a known pattern that is reordered at the receiver. This can work in the upstream as well in the proposed skew of mini-slots to reduce interleaving depth by using adjacent mini-slots instead of subcarriers. This is analogous to pre-distortion, pre-equalization, or pre-coding. Pre-interleaving provides an elegant solution to quiet channel measurement.

In addition to the examples above, Example 5 can also be used to send a wide band probe in a single OFDM symbol in the channel with either downstream convolutional interleaving or upstream mini-slot skew interleaving. The OFDM symbol builder which takes the input bitstream and maps the data into the appropriate QAM symbols for the IFFT can insert the test QAM subcarriers (null value of 0+j0 or a probe sequence value like PRBS BPSK values, complex sequence values, etc.) using a state machine that is synchronized with the phase of the convolutional interleaver commutator. This is only slightly more complexity than a simple counter. When triggered (i.e. in response to the "pause"), the test QAM subcarriers are inserted (null value of 0+j0 or a probe sequence value like PRBS BPSK values, complex sequence values, etc.) in the most delayed paths in the first symbol, insert the next QAM test symbol into the second to most delayed paths on the second symbol, and so on up to the first undelayed paths on the Nth symbol for an interleaver with depth N. This state machine can be triggered at any time to make a channel measurement without any framing required, just synchronization with the interleaver phase to start the above process. The resulting interleaver output of the pre-interleaved OFDM symbol sequence can be a single null or probe symbol across all subcarriers. The CP is prepended and the IFFT modulates the symbol and transmits it into the channel. On the receive side, the receiver looks for the test OFDM symbol with a marker, time stamp, MAC message or whatever is easiest to avoid complexity of upper layer protocols. An FFT can recover the test OFDM symbol with all QAM test or null subcarriers. This so-identified symbol is considered null data by the demodulator. This FFT can be a separate processor as used for the full band capture front end. That is, perform desired processing including or removing the CP, then average, window, compute MER, etc.

In an embodiment, the symbol constellations include null symbols. For null carriers, the interleaver and other blocks can have an extra bit indicating null value. For example, this is like having 257 QAM, instead of normal 256 QAM, where the 257th point is a Cartesian zero, at the origin of the constellation diagram, 0+j0. A silent symbol is just like any other symbol, except the QAM constellation points are numerically 0+j0. This last constellation point (zero) can be modulated onto all carriers. RF muting can be better if it can be done, that is, turn off the RF completely. However that is difficult to do without providing extra time for the RF circuits to settle. Muting each subcarrier digitally by modulating it with a zero symbol, is more practical in some circumstances.

In an embodiment pilots are turned off during a quiet probe symbol. Receiver algorithms operate on the same circumstances as when a symbol is missing, such as during a burst of noise in the channel. Further the RF automatic gain control can be frozen (paused) during the quiet symbol, whose arrival will be known in advance and indicated, for example, by the receive enable/pause control signal 435. Further, in some circumstances, the absence of energy in the OFDM symbol can be detected, with some delay. In addition, a probe symbol can be generated that is not fully quiet, but only some tones are quiet. The total power of the probe symbol can be selected to be the normal power of an OFDM symbol.

In an embodiment, there can be gaps in the PLC narrowband acquisition. In particular, DOCSIS 3.1 is designed to work with gaps. A quiet symbol can be placed inside the gap with no impact on the PLC.

While delay through the Epoc PHY can generally be constant in a DOCSIS implementation, an occasional missing (quiet) symbol can be compensated smoothing the flow using a FIFO, and synthesizing input and output rates of the FIFO using a rational NCO. For example, if $\frac{1}{1000}$ of the OFDM symbols are silent, synthesize two clocks with the ratio 999/1000. Another approach is to not burden Epoc with the silent probe issue, just use it on DOCSIS 3.1.

In a cable system embodiment, having the input and output of the cable plant will permit use of "system identification" techniques. This involves having a model of the plant, including nonlinearities and filter effects. One such model is:

lowpass filter→amplifier with compression→lowpass filter.

The parameters of the model can be adjusted to minimize the error between the model and the actual data. For this to work, samples are taken from the input and output of the plant. Output samples in the receiver, can be provided to the channel estimation block such as a PNM server for processing. Samples at the input to the plant, i.e., the transmitted samples, can be obtained by either (a) remodulating the FEC-corrected subcarriers at the receiver, or (b) by having the headend save the samples of a normal OFDM symbol that it transmitted. Either way, the input and output samples of the channel can be obtained. For method (b), a spec on the CMTS 305 transmitter can capture the samples of a designated OFDM symbol. For method (a), a spec on the receiver can provide the information necessary for the remodulation processing.

As previously discussed, a probe symbol 302 can occupy all OFDM tones in the symbol, or only a partial number of tones. In one example, only part of the probe symbol 302 can be quiet. The total power can be normal so as not to affect analog AGC. This can allow investigation of harmonics, in the Example of FIG. 8 where tones from 200-250 MHz are on. A further embodiment can be to also leave the pilots on during the probe.

In an embodiment, histograms can be employed at different points (upstream and/or downstream) to provide useful orthogonal information to spectrum capture, if there is a set of problems with failure scenarios that are hard to distinguish with spectrum data only. In model-based linearization, the nonlinearity of an amplifier is modeled mathematically with some number of parameters P1, P2, P3, etc. The mathematical model may include memory if the nonlinearity is a function of the voltage history, and not just the instantaneous voltage. The model is inverted with some number of parameters Q1, Q2, Q3 . . . related to the parameters P. One method is to invert a remote nonlinearity with a local inversion block and local observation. For example, say there are several nonlinear amplifiers in the plant, each with some power series description. The cascade will also have a power series description. If the incoming waveform is observed and associated with a priori information to reconstruct the transmitted waveform, the parameters P and Q can be estimated and the nonlinearity inverted. This is easier if the transmitted signal statistics are known. Monitoring can identify a broken amp in one of many paths. There are also enhanced cable modems (CMs) embedded in the hardline plant called DMONs (Downstream Monitors). These can be employed to capture histograms as well.

In an embodiment, a counter approach can be employed to optionally pause transmit and receive functions. The operation of such a counter approach can be described in conjunction with the following analogy. Assume you are watching a movie, pause the DVD player to get up for a break, and come back and start it again. With respect to the counter on the DVD player display, everything is smooth; it continues from where it left off with no glitch, and of course the sequence of frames in the film is unaffected by the break time. However if the DVD player tried to use real time to present its video frames after the break, it can have to subtract out the break time from the counter and things can get complicated. By using the counter, which paused along with the content, everything is smooth and the DVD player counter barely even knows the break occurred. So the idea of the pause button in the downstream is that the MAC will not have to change anything except use the virtual counter instead of the real-time counter.

These techniques can be applied to the processing blocks 440 as follows. Assume there are 3840 subcarriers in the system, and that an FEC encoder 404 happens to end on subcarrier 500. In the normal case with no quiet probe, the FEC encoder 404 can start on say subcarrier 1900 of OFDM symbol n and end on subcarrier 500 of OFDM symbol n+1. So, it can occupy SC 1900-3840 of symbol n, and SC 1-500 of symbol n+1. In the case with a quiet probe inserted, the FEC encoder 404 can occupy SC 1900-3840 of symbol n, and SC 1-500 of symbol n+2. Symbol n can be quiet. From another viewpoint, the pause functionality implies conceptually maintaining two symbol counters: a real-time symbol counter and a virtual symbol counter. The virtual counter does not count the quiet probe symbols, so there can be no gaps in its count sequence. The virtual counter can be used for FEC, etc.

The further operation of the transmitter 480 and receiver 490 in conjunction with the generation and transmission of probe symbols 302, command data 304 and feedback data 306 can be described in conjunction with the following additional examples.

Probe symbols 302 operate to permit measurement of cable plant 310 or other communication channel 199 and in particular a cable plant response including underlying noise and interference. Both linear and nonlinear response of the cable plant 310 can be measured. The analysis of such a response can provide a wideband, short-duration view of the cable plant 310 or other communication channel 199. In operation, the transmitter 480, such as in a CMTS 305, transmits a downstream probe symbol 302 at a predefined interval that is programmable in the range of 1 second to 10 minutes. The probe symbol 302 includes the following modes:

(a) Standard-pattern frequency-domain probe. A number of standard test patterns are employed, such as 16 or some other number. These standard test patterns include pre-defined patterns that are defined by frequency domain values corresponding to sub carrier QAM modulation values. A CMTS 305 inserts these samples at the input of IFFT 406 or at the mux 412. The CMTS 305 further inserts a cyclic prefix. In particular, the baseband processor 440 accepts a control from the probe symbol generator 416 to insert or not insert pilots. When a probe symbol is inserted in this fashion, the baseband processor 440 does not perform interleaving or FEC on this probe symbol.

(b) Arbitrary time-domain probe. The CMTS 305 accepts a sequence of time domain samples. The CMTS 305 inserts these samples, via multiplexer 412 at the modulator 414 input as a replacement for one entire OFDM symbol. In an embodiment, the CMTS 305 does not perform pilot insertion, CP insertion, interleaving or FEC encoding on this probe symbol.

(c) Noise power ratio (NPR) probe. The CMTS 305 accept values for notch beginning frequency and notch ending frequency. The CMTS 305 transmits a known test pattern in all subcarriers except the notch subcarriers. The CMTS 305 transmits zero values (zero RF or substantially zero RF) in the notch subcarriers. The CMTS 305 inserts a cyclic prefix. The CMTS 305 optionally does not perform pilot insertion, interleaving or FEC encoding on this probe symbol.

(d) Quiet probe. The CMTS 305 transmits all zero samples (zero RF or substantially zero RF) during the period of one full OFDM symbol. In an embodiment, some subcarriers are left active, with total symbol power maintained at normal level, to avoid a fully quiet symbol.

In accordance with these examples above, the receiver 490, such as a receiver of a CM 320, captures the received probe symbol 302 and performs the following processing via analyzer 475 to generate feedback data 306.

(a) Time domain sample capture. The CM 320 captures the time domain (I and Q) samples corresponding to the probe symbol. The CM 320 also captures additional samples ⅛ of a symbol before and ⅛ of a symbol after the probe symbol, for a total of 1.25 times the duration of the probe. The CM 320 can send captured samples as feedback data 306 in response to a request from the CMTS 305 via command data 304.

(b) Spectrum. The CM 320 computes the FFT power spectrum of the probe symbol using the same FFT size used for data reception. The CM 320 can apply windowing to the spectrum. For example, a Hanning windowing can be employed which is equivalent to complex convolution in frequency domain with sequence [−¼, ½, −¼]. Other windowing can likewise be employed. The CM 320 can perform true-power averaging of spectra of multiple probes using, for example, a leaky integrator with programmable time constant in the range of 1 to 128 averages. The CM 320 can accept command data 304 from the CMTS 305 to restart spectrum averaging. The CM 320 can provide feedback data 306 in the form of max-hold spectrum showing maximum power value of each bin since last reset. The CM 320 can send feedback data 306 that indicates the latest averaged spectrum and/or max-hold spectrum to the CMTS 305 upon request, via command data 304.

In an embodiment, the analyzer 475 or CM 320 processes each type of probe symbol 302 to generate the following examples of feedback data 306.

(a) Standard-pattern frequency-domain probe. The CM 320 can make measurements on the probe symbol. Examples include power and RxMER (receiver modulation error ratio) of each subcarrier; and total received power, etc. RxMER can be computed using the known constellation points of the probe pattern, not using decisions.

(b) Arbitrary time-domain probe. The CM 320 can make measurements on the probe symbol. Examples include total received power, etc.

(c) Noise power ratio (NPR) probe. The CM 320 can make measurements on the probe symbol. Examples include: Ratio of average power outside notch to average power in notch (excluding 4 bins at each edge of notch and excluding outlier bins 10 dB or more above average); power and RxMER of each subcarrier; total received power, etc.

In a further example, the CMTS 305 and CM 320 can cooperate to synchronize probes in multiple OFDM bands. In particular, such a configuration permits a view of harmonics or other effects in one band, while a stimulus is provided in another band. The CMTS 305 transmits an active probe in one band such as 200 MHz, and simultaneously transmits a quiet probe in another band, such as at the $3^{rd}$ harmonic, 600 MHz. The CM 320 captures and processes the probe in the quiet band, and provides spectra, raw samples, etc. allowing the harmonic to be viewed and analyzed. Some leeway is provided in the synchronization of the two probes. This error can be removed in post-processing of the samples. In operation, the CMTS 305 includes the capability of transmitting probe symbols simultaneously in two OFDM bands. The CMTS 305 can synchronize the probes in the two bands to an accuracy of, for example, +/−10 OFDM FFT clock periods.

In a further example, the CMTS 305 and CM 320 can cooperate to share frequency band measurements. In particular, such a configuration permits measurement of intermittent noise and interference and/or provides a narrowband, long-duration view of a portion of the channel. An exclusion band is employed as a programmable contiguous set of subcarriers with zero modulation (zero RF). The CM 320 receives a list of start and stop frequency bins, via command data 304, defining up to 16 bands across the receive spectrum. The bands may or may not overlap. The CM 320 provides measurements for each defined band as feedback data 206. Examples include: time-averaged power; max-hold power; time-averaged spectrum; max-hold spectrum; time-averaged power taken during intervals when energy or no energy is present (when power in band is above/below defined threshold), etc.

In a further example, the CMTS 305 and CM 320 can cooperate to share a wideband spectral display. In particular, such a configuration provides wideband spectrum analyzer function in the CM 320 that can be reported via feedback data 206. The CM 320, via analyzer 475, provides wideband spectrum analysis capability per existing DOCSIS spectrum analysis MIB. The CM 320 can, for example, provide a spectrum analysis bandwidth of 192 MHz or greater. The CM 320 may optionally provide a spectrum analysis bandwidth covering the full downstream spectrum of the cable plant 310 or other communication channel 199.

In a further example, a CM 320 may provide a CMTS 305 value of the CM's equalizer coefficients via feedback data 306—for example, in response to a request from the CMTS 305 via command data 304.

In a further example, the CMTS 305 and CM 320 can cooperate to share FEC statistics, or otherwise to monitor link quality by keeping statistics on FEC error events. The CM 320 can measure FEC statistics that are shared via feedback data 306. Examples include total number of codewords, number of codewords passing parity check, number of codewords failing parity check, errored seconds since last query, and count of errors in each 1-second interval since last query up to 10 minutes, etc. This feedback data 306 can provide details of categories of errors such as LDPC, BCH, codeword length, normal vs. shortened codeword, etc.

In a further example, the CMTS 305 and CM 320 can cooperate to generate a receive channel estimate such as a channel estimate that is computed by the receiver as part of its normal operation, based on pilots. The CM 320 generates the receive channel estimate and sends the receive channel estimate as feedback data 306 to the CMTS 305 upon request, via command data 304.

In a further example, the CMTS 305 and CM 320 can cooperate to share per-subcarrier RxMER and power measurements made by the receiver. This permits viewing the frequency dependence of the overall performance of the channel. Intent is to use granularity already provided in system, be it per-subcarrier, per-minislot, etc. In operation, the CM 320 makes RxMER measurements per subcarrier, and/or Rx power measurements per subcarrier. The CM 320 can provide average measurements of RxMER and Rx power over all nonzero subcarriers, over zero-RF subcarriers, over pilots, and over data subcarriers via feedback data 306. Averaging can be performed on true power and can be done with a leaky integrator filter with programmable time constant of 1 second to 1 minute, or no averaging. The CM 320 can send these measurements to the CMTS 305 via feedback data 306 upon request via command data 304.

In a further example, the CMTS 305 and CM 320 can cooperate to share QAM constellation for viewing and analysis. In an embodiment, since amount of data can be large, a reduced size record can be stored and sent to the CMTS 305 via feedback data 306. The CM 320 can capture the received constellation when commanded by the CMTS 305, via command data 304. Various modes can be used including:

(a) Full constellation. Soft-decision data can be shared from, for example, up to 10 OFDM symbols. Size can be, for example, up to 8K*10=80K complex numbers, 12 bits each on I and Q, total=about 2 Mbit.

(b) Quantized constellation. A soft decision data can be quantized, for example, to ⅛ the distance between constellation points, that is, binned into a 2-dimensional histogram. Each bin can be recorded, for example, as a 1-bit value. The effect is that duplicates are removed, since once a location is "hit" it is given the value 1, and if hit again it still retains the value 1. The maximum number of points can be, for example, 4096*8*8=256K bits. A constellation can be accumulated for a programmable number of OFDM symbols.

(c) Compressed constellation. This mode can include, for example, up to 4096 constellation points with mean and standard deviation of each inner point, plus up to 100 soft decision samples lying outside constellation boundary. Size can be, for example, 4096*2*12+100*2*12=about 100K bits.

(d) Error constellation. This mode can capture the difference between the soft decision and the correct or nearest constellation point. This can, for example, be done for a single OFDM symbol. Maximum size can be, for example, about 8192*2*12=about 200K bits. The error constellation is most accurate when data is known, such as pilots or zero-RF subcarriers, or for probe symbols with known data pattern, as no decision errors occur with known data.

(e) Compressed error constellation. This mode can capture the difference between the soft decision and the correct or nearest constellation point and, for example, only report the mean and standard deviation of the error, plus up to 100 error samples lying outside decision. Total size=2*12+100*2*12=about 2.5K bits.

In a further example, the CMTS 305 and CM 320 can cooperate to share a measurement of impulse/burst noise (timestamp, duration, level, correlation with FEC errors). The CM 320 can detect burst/impulse noise events above a programmable threshold and can timestamp the event using the mini-slot counter, with resolution of, for example, 1 sample of the OFDM FFT clock. The CM 320 can measure the duration of the event with resolution of 1 sample of the OFDM FFT clock and further can measure the true average power of the samples during the duration of the event. The CM 320 can also timestamp FEC blocks containing errors so that they may be compared to the timestamps of burst/impulse noise events. Any or all of this data can be provided as feedback data 306.

In a further example, the CMTS 305 and CM 320 can cooperate to share a histogram of wideband samples—e.g. to provide a view of nonlinear effects in the channel such as amplifier compression and laser clipping. For example, this allows detection of laser clipping that causes one tail of the histogram to be chopped off, and replaced with a spike. The CM 320 can capture the histogram of the time domain samples at the wideband front end of the receiver and share histogram information via feedback data 306. The histogram can have a resolution of at least 256 bins. The histogram can be two-sided, that is, encompass values from the most negative to most positive values of the samples. The histogram can be accumulated over a programmable period of, for example, 1 second to 1 minute, or until reset based on command data 304.

FIG. 5 illustrates an embodiment 500 of an OFDM symbol stream. In particular, an OFDM symbol stream 510 is shown graphically in time and frequency. In the embodiment shown, a frequency range of 192 MHz can be employed, however, other ranges can be used in other embodiments. As shown, enable pause control 506, such as receive enable/pause signal 425 or transmit enable/pause signal 435, indicates times in the OFDM symbol stream 510 where probe symbols 502 and 504 are inserted. In the embodiment shown, the enable/pause control 506 is a periodic signal.

In operation, the baseband processor pauses OFDM counters for one OFDM symbol in response to the enable/pause control 506 to insert each probe symbol. For quite probe symbols, the transmitter of the CMTS 305, CM 320 or other device transmits silence (zero) during this time period. The receiver at the CMTS 305 or CM 320 captures a number of samples, such as 4K+ or 8K+ samples during this symbol period including the cyclic prefix and surrounding samples. These samples are buffered via the buffered samples and sent to the PNM server or other processor to measure and characterize noise floor, etc. of the communication channel 199, such as cable plant 310. For active probe symbols, the transmitter of the CMTS 305, CM 320 or other device transmits a probe signal. The receiver at the CMTS 305 or CM 320 captures a number of samples, such as 4K+ or 8K+ samples during this symbol period including the cyclic prefix and surrounding samples. These samples are buffered via the buffered samples and sent to the PNM server or other processor to measure and characterize transfer function of the communication channel 199, such as cable plant 310.

Figure 6:
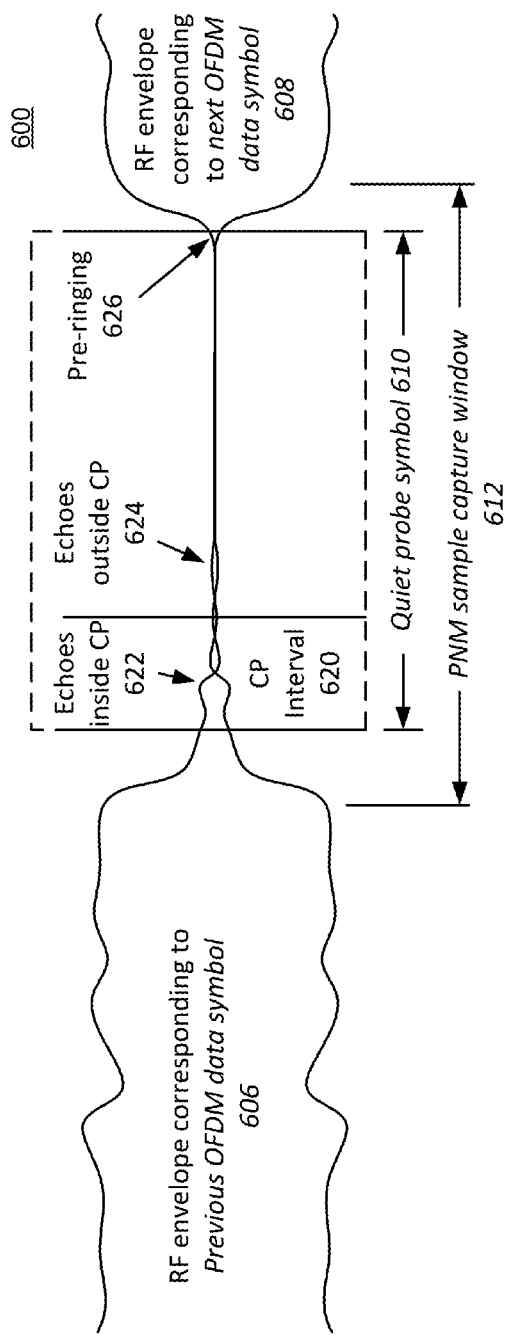
FIG. 6 illustrates an embodiment 600 of a quiet probe symbol.

FIG. 6 illustrates an embodiment 600 of a quiet probe symbol. As previously discussed a quiet symbol can be generated by transmitting no RF or substantially no RF. During a quiet probe symbol 610, the receiver samples noise/interference by capturing PNM samples during a PNM sample capture window 612 from before the end of a previous OFDM data symbol 606 to after the beginning of a next OFDM data symbol 608. The processing of these PNM samples allows measurement of ringing into and beyond CP interval 620, such as echoes in the CP 622 and echoes outside the CP 624. The processing of these PNM samples also allows measurement of pre-ringing 626 into end of quiet probe symbol 610 as well as the measurement of other parameters such as noise floor.

Figure 7:
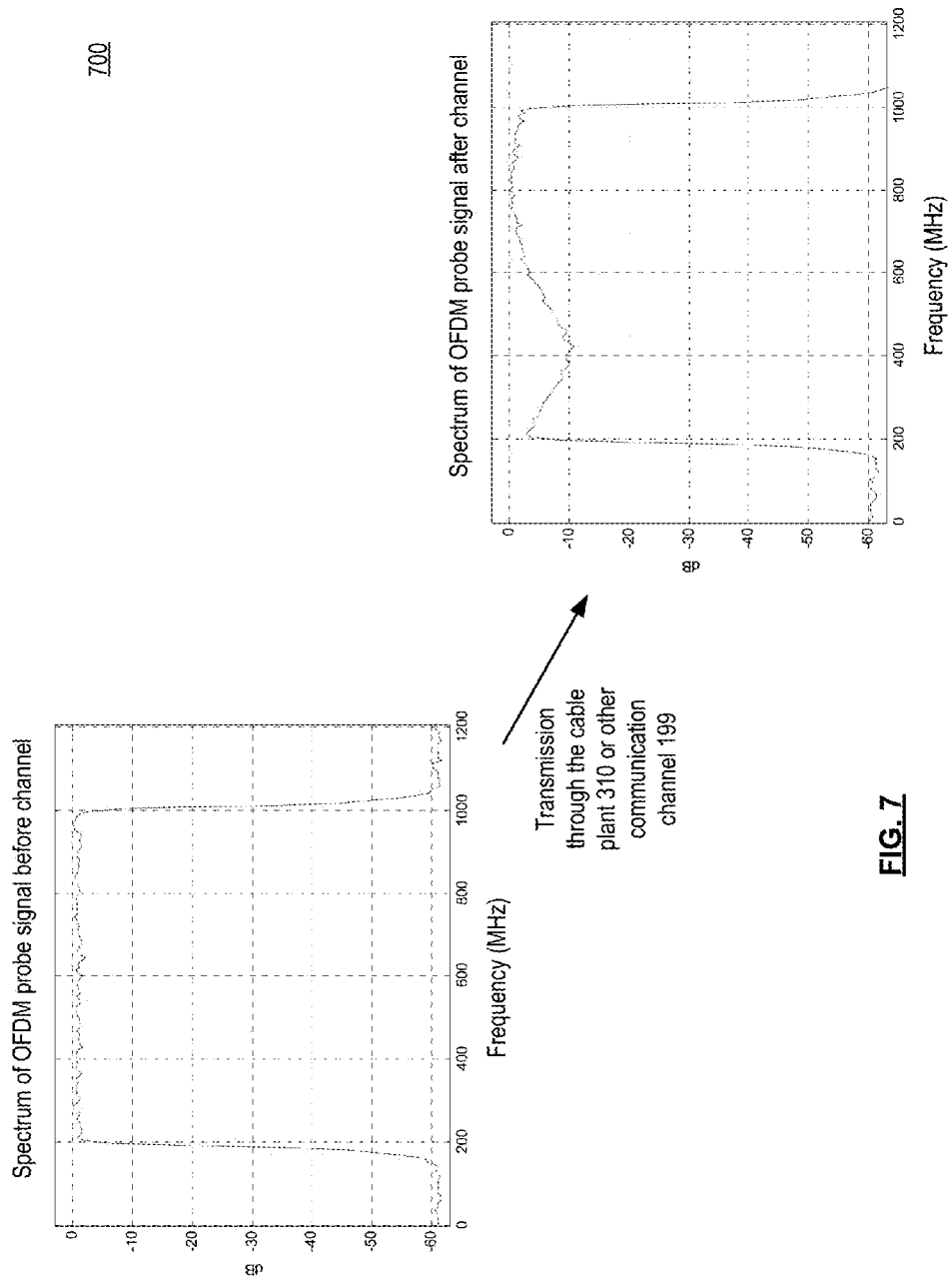
FIG. 7 illustrates an embodiment 700 of an active probe symbol.

FIG. 7 illustrates an embodiment 700 of an active probe symbol. While the example presented in conjunction with FIG. 6 was a quite probe symbol, non-quiet or active probe symbols may also be employed. In particular, active probe symbols can be used to characterize transfer function of cable plant including complex frequency response (amplitude and group delay), nonlinear response including amplifier compression, laser clipping, diode rectification effects, and/or other effects generated via histogram techniques or other methodologies. These active symbols can use some or all subcarriers for each OFDM probe symbol time.

In operation, the transmitter 480 can insert any desired RF samples during probe symbol time. For example, a frequency domain probe can be generated that is wideband that uses all subcarriers or, in the alternative, some subcarriers may be muted to view harmonics and intermodulation products from active subcarriers. In a further example, a time domain probe can be employed. In particular, some portions of the probe signal in time may be muted to view ringing of channel. The cyclic prefix may or may not be included in a probe symbol. In particular, a CP can be included in circumstances where the probe symbol is intended to be demodulated by receiver as a data signal.

In the example shown, a wideband probe symbol is generated. While the spectrum of the OFDM probe signal is substantially flat before transmission on the cable plant 310 or other communication channel 199, the channel introduces micro reflections that modify the spectrum after the channel.

Figure 8:
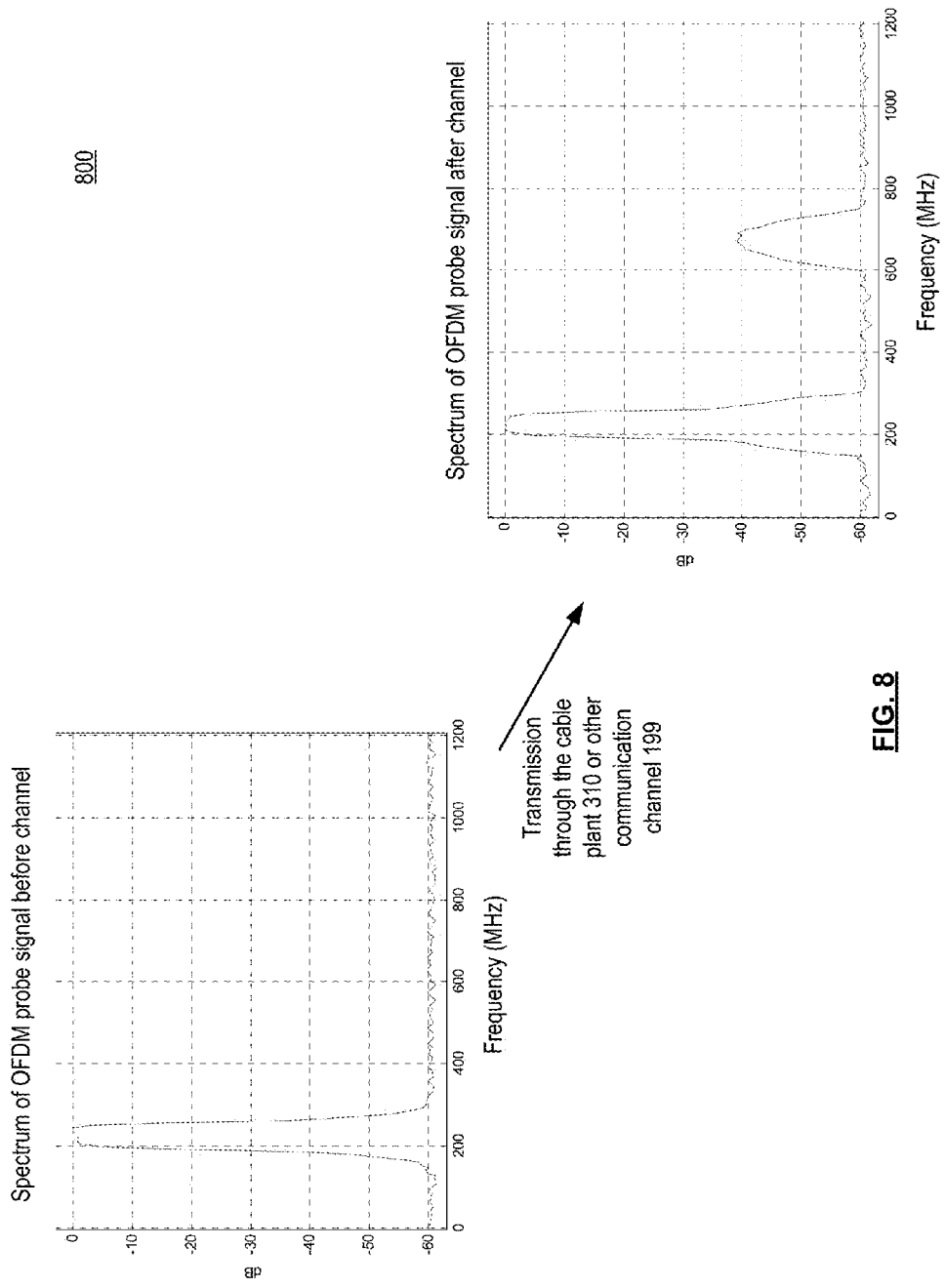
FIG. 8 illustrates an embodiment 800 of an active probe symbol.

FIG. 8 illustrates an embodiment 800 of an active probe symbol. In the example shown, a narrowband probe symbol is generated. As shown, the cable plant 310 or other communication channel 199 introduces a −40 db distortion term at the third harmonic of the transmitted signal.

Figure 9:
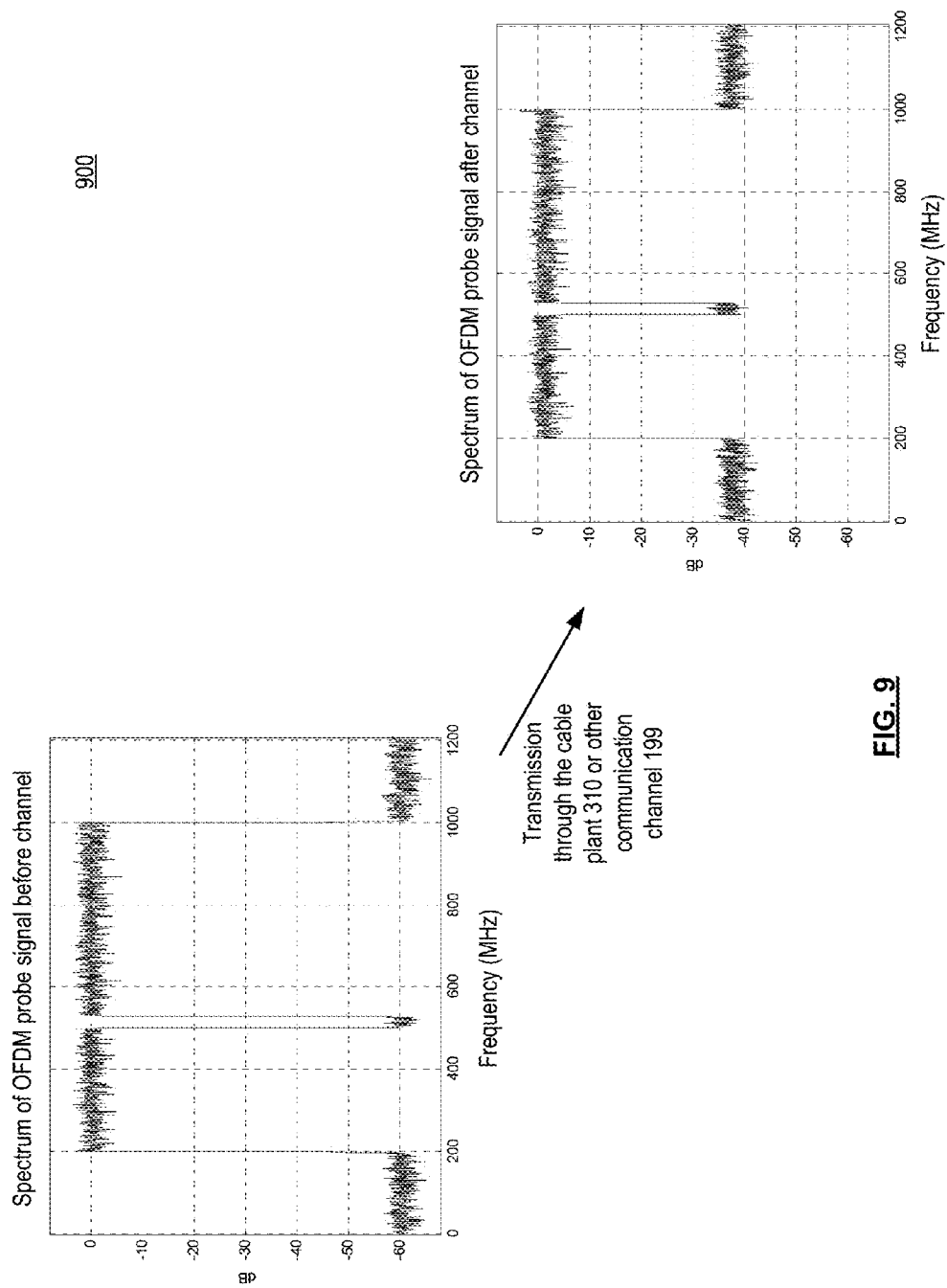
FIG. 9 illustrates an embodiment 900 of an active probe symbol.

FIG. 9 illustrates an embodiment 900 of an active probe symbol. In the example shown, a wideband probe symbol is generated with a notch. In operation, the notch fills with intermodulation products, and/or other harmonics generated by the channel. As shown, the cable plant 310 or other communication channel 199 introduces a −40 db distortion term at the notch frequency. The notch frequency can be swept to determine results at different frequencies. More generally, any combination of quiet bands and active probe symbols can be employed. In particular, transmitters can be synchronized via a common time reference or other synchronization control to schedule a quiet probe symbol in one or more OFDM bands at the same time as an active probe symbol in one or more other OFDM bands. The captured received samples in the quiet band, along with knowledge of the active probe symbols that caused them, can be used to analyze the impairment causing harmonics.

FIG. 10 illustrates an embodiment of probe symbol insertion. As discussed in conjunction with FIG. 4, a (wideband or narrowband) probe can be interleaved prior to insertion into an interleaved probe symbol 1000. In particular, null QAM values can be inserted at the input to the interleaver 410 of FIG. 4. These values are scattered in a specific "reverse interleaved" mapping 1005 such that the interleaving function of the interleaver 410 can re-group them into contiguous probe symbol 1002 with contiguous tones across a single OFDM symbol. In response to the transmit enable/pause signal 425, the blocks feeding the interleaver 410 can know that these QAM slots were not available, and not insert data values into them. This can avoid the issue of pausing MAC and TC blocks, as the opportunities can be scattered in the normal data flow, rather than grouped. The PHY can still see a missing symbol or portion of a symbol. A state machine associated with the processing module such as baseband processor 440 can be used to do the reverse interleaving mapping 1005 and the associated control.

Figure 11:
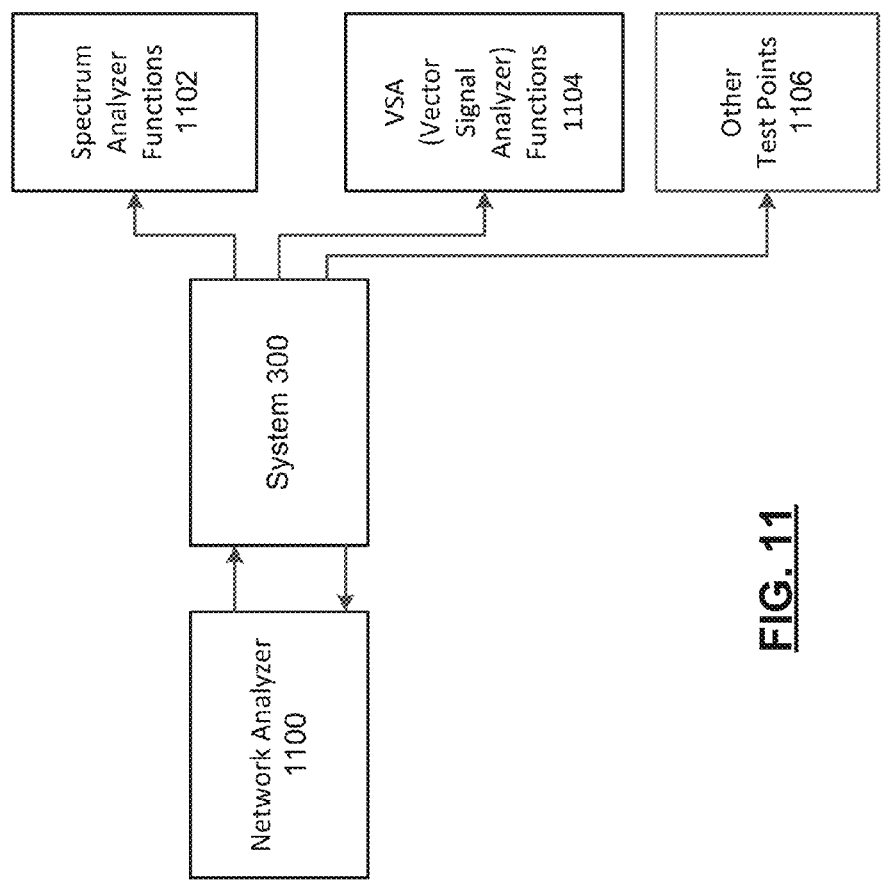
FIG. 11 illustrates an embodiment of a network analyzer 1100.

FIG. 11 illustrates an embodiment of a network analyzer 1100. In particular, a network analyzer 1100 is presented for use with a system, such as the system 300 described in conjunction with FIG. 3 that includes at least one CMTS 305, cable plant 310 and a plurality of cable modems 320. While the CMTS 305 and CMs 320 are shown separate from the cable plant 310, it can be noted that the entire system 300 can be considered a cable plant. In particular cable plant 310 can represent portions of the cable plant that are separate from CMTS 305 and CMs 320. It can also be noted that, while described as a cable plant or a DOCSIS 3.1 compatible cable system, the various embodiments can be employed in other cable systems that include a CMTS 305 and CM 320. Also, the techniques described herein can likewise be applied to other wired or wireless systems, and in particular, to other network elements and subscriber devices used in such systems.

In operation, the network analyzer 1100 treats the system 300 as a device under test (DUT) to monitor, test, analyze the performance of system 300, and to generate test results in the form of reports and other test data. In an embodiment, any of the active and passive probe symbol transmission types described in conjunction with FIGS. 1-10 can be used in this regard, however other testing can also be employed.

The operation of network analyzer 1100 and system 300 can provide Proactive Network Maintenance (PNM). In particular, a plurality of proactive network maintenance functions such as spectrum analyzer functions 1102, vector signal analyzer functions 1104 and other test point functions 1106 of CMTS 305 and cable modems 320 can be leveraged to enable measurement and reporting of network conditions such that undesired impacts such as plant equipment and cable faults and interference from other systems and ingress can be detected and measured. With this information cable network operations personnel can make modifications necessary to improve conditions and monitor network trends to detect when network improvements are needed. In one example, the system 300 can operate in accordance with a DOCSIS 3.1 PHY specification.

As shown, FIG. 11 provides examples of the components, test points, and management capabilities of the Proactive Network Maintenance provided in conjunction with network analyzer 1100 to monitor, test, and analyze the performance of system 300. The CMTS 305 and CM 320 contain test points, which include functions of a spectrum analyzer 1102, vector signal analyzer (VSA) 1104, and other test points 1106 to be used in conjunction with the network analyzer 1100. The goal is to rapidly and accurately characterize, maintain and troubleshoot the upstream and downstream cable plant, in order to guarantee the highest throughput and reliability of service. The spectrum analyzer functions 1102 can include full-spectrum, narrow spectrum, notch spectrum or other spectral analysis that is either triggered or un-triggered. The VSA functions 1104 can include determining pre-equalizer and equalizer coefficients, constellation displays, RxMER vs. subcarrier measurements for DS and/or US. Other test point functions 1106 include FEC statistics, impulse noise statistics and/or histograms. Further functions performed by CMTS 305, CM 320 and network analyzer 1100 are presented in conjunction with the examples that follow.

The following downstream PNM actions define CMTS 305 and CM 320 functions for obtaining and buffering symbol samples, triggering collection of upstream spectrum conditions information, providing wideband spectrum analysis, employing excluded subcarriers as a spectral notch, providing equalizer coefficient values, providing QAM constellation points for display, obtaining and reporting receiver MER measurements, obtaining and reporting forward error correction statistics, and reporting signal histograms for the downstream channel.

As discussed in conjunction with FIG. 3, actual data-carrying symbols may be used to fulfill the function of active probe symbols 302. In particular, any type of data symbol can be used for this purpose. For this to be most effective, the contents of the data-carrying symbols are captured at the transmitter so that they may be compared with the received samples to characterize the transfer function of cable plant 310 or support other proactive network management functions as described herein. When the probe symbol is a data symbol, no special probe insertion is needed. Rather, the contents of the data symbol are captured at the transmitter for later comparison with the received samples, which are also captured at the receiver. Synchronization is required to ensure that the same symbol is captured at the transmitter and receiver. Such synchronization may be provided by a trigger message as described in conjunction with FIG. 12.

Downstream Symbol Capture

The purpose of downstream symbol capture is to provide partial functionality of a network analyzer 1100 to analyze the response of the cable plant. At the CMTS 305, the frequency-domain modulation values of one full OFDM symbol before the IFFT, are captured and made available for analysis. This includes the I and Q modulation values of all subcarriers, including data subcarriers, pilots, PLC preamble symbols and excluded subcarriers. This capture can result in a number of data points equal to the FFT length in use (e.g., 4096 or 8192), 16 bits can be used as the width for each of I&Q, with LSBs padded with zeroes if required.

At the CM 320, the received I and Q time-domain samples of one full OFDM symbol before the FFT, not including the guard interval, at the 204.8 MHz FFT sample rate, are captured and made available for analysis. This capture can result in a number of data points equal to the FFT length in use (4096 or 8192), 16 bits in width for each of I&Q, with LSBs padded with zeroes if required. The capture can include a bit indicating if receiver windowing effects are present in the data.

Capturing the input and output of the cable plant is equivalent to a wideband sweep of the channel, which permits full characterization of the linear and nonlinear response of the downstream plant. The MAC provides signaling via the PLC Trigger Message to ensure that the same symbol is captured at the CMTS 305 and CM 320. In an embodiment, the CMTS 305 can be capable of capturing the modulation values of one full downstream symbol for analysis. In an embodiment, the CM 320 can be capable of locating and capturing the time-domain samples of one full downstream symbol for analysis.

Downstream Wideband Spectrum Capture

In an embodiment, downstream wideband spectrum capture provides a downstream wideband spectrum analyzer function in the DOCSIS 3.1. CM 320 similar to the capability provided in DOCSIS 3.0. In an embodiment, the CM 320 can provide a downstream wideband spectrum capture and analysis capability. The CM 320 can also provide the capability to capture and analyze the full downstream band of the cable plant.

Downstream Noise Power Ratio (NPR) Measurement

The purpose of downstream NPR measurement is to view the noise, interference and intermodulation products underlying a portion of the OFDM signal. The CMTS 305 defines an exclusion band of zero-valued subcarriers which forms a spectral notch in the downstream OFDM signal. The CM 320 provides its normal spectral capture measurements, which show the notch depth. The maximum notch width can be selected for example as a value that can normally not exceed 10 MHz. A possible use case is to observe LTE interference occurring within an OFDM band; another is to observe intermodulation products resulting from signal-level alignment issues.

In an embodiment, the CMTS 305 can be capable of accepting start and stop subcarrier indices defining an exclusion band (notch). The CMTS 305 can also set the modulation value of all subcarriers in the notch to zero (no energy).

Downstream Equalizer Coefficients

The purpose of equalizer coefficients is to provide access to CM 320 downstream adaptive equalizer coefficients, which describe the linear response of the cable plant. The OSSI spec can define summary metrics to avoid having to send all equalizer coefficients on every query. In an embodiment, the CM 320 can report its downstream adaptive equalizer coefficients (full set or summary) for any single OFDM block upon request.

Downstream Constellation Display

The downstream constellation display provides received QAM constellation points for display. Equalized soft decisions (I and Q) at the slicer input are collected over time, with optional subsampling to reduce complexity, and made available for analysis. Start and stop indices define the range of subcarriers which are included in the measurement. In an embodiment, only data-bearing subcarriers with the specified profile and QAM constellation are sampled; pilots and excluded subcarriers within the range can be ignored. 8192 samples can be provided for each query—though a greater or fewer number can be used; additional queries may be made to further fill in the plot. In an embodiment, the CM 320 can be capable of capturing and reporting received soft-decision samples, for a single selected profile, single constellation, and selectable range of subcarriers within a single OFDM Block.

Downstream Receive Modulation Error Ratio (RxMER) Per Subcarrier

The downstream receive modulation error ratio (RxMER) per subcarrier provides measurements of the receive modulation error ratio (RxMER) for each subcarrier. The CM 320 measures the RxMER using pilots and zero-valued subcarriers, which are not subject to symbol errors as data subcarriers can be. Since scattered pilots visit all data subcarriers, and zero-valued subcarriers are located in defined locations including exclusion bands, the RxMER of all subcarriers in the active OFDM band can be measured over time. The scattered pilot pattern overlaps the PLC preamble symbols, which are used for the measurement as if they were pilots.

In an embodiment, only those zero-valued subcarriers which are processed by the CM 320 receiver are measured. For the purposes of this measurement, RxMER is defined as the ratio of the average power of the equalized QAM constellation to the average error-vector power. For pilots, the error vector is the difference between the equalized received pilot value and the known correct pilot value. For zero-valued subcarriers, the error vector is the unequalized received value itself, since the correct value is zero and there is no reliable channel estimate for excluded subcarrier locations with which to perform equalization. Using this definition, the noise measurement of a zero-valued subcarrier is expressed in terms of an equivalent RxMER value using the average QAM constellation power as a reference.

In one example of operation, for an ideal AWGN channel, an OFDM block containing a mix of QAM constellations, including some zero-valued subcarriers, with 35 dB CNR on the QAM subcarriers, can yield an RxMER measurement of nominally 35 dB for all subcarrier locations including the zero-valued subcarriers. In an embodiment, the CM 320 can be capable of providing measurements of the RxMER for all subcarrier locations for a single OFDM Block, using pilots, PLC preamble symbols, and/or zero-valued subcarriers for the measurement. The CM 320 may omit measurements on some zero-valued subcarriers.

Signal-to-Noise Ratio (SNR) Margin for Candidate Profile

The purpose of this feature is to provide an estimate of the SNR margin available on the downstream data channel with respect to a candidate modulation profile. The following algorithm can be used to compute this estimate. The CM 320 only performs this computation upon request. The same computation is done for the NCP channel.

Algorithm:
(1) The CM 320 measures the RxMER value for each data subcarrier as specified in above.
(2) From these measurements it calculates the average RxMER per data subcarrier, MER1.
(3) It accepts as an input the required average MER per subcarrier for the candidate profile, MER2.
(4) The SNR margin is defined as MER1-MER2, where all quantities are in dB.

As an example, if the CM 320 measures MER1=33 dB, and the candidate profile requires MER2=30 dB, the CM 320 reports an SNR margin of 3 dB. In addition, the CM 320 reports the number of subcarriers whose RxMER is at least x dB below the threshold of CER=1e-5 for a given QAM order, where x is a configurable parameter with, for example, a default value=3.

Downstream FEC Statistics

The purpose of the FEC statistics is to monitor downstream link quality via FEC and related statistics. Statistics are taken on FEC codeword error events, taking into account both the inner LDPC code and outer BCH code, and are provided on each OFDM channel and for each profile being received by the CM 320. The measurements can be time-stamped, for example, using bits 21-52 of the 64-bit extended timestamp, where bit 0 is the LSB, which provides a 32-bit timestamp value with resolution of 0.4 msec and range of 20 days. Timestamping can be performed with nominal accuracy of 100 msec or better. In an embodiment, codeword counts and codeword error counts can include only full-length codewords, i.e., having LDPC codewords of size 16,200 bits. Similar statistics can be taken on the NCP, also only using full-length codewords, and on the PLC. MAC packet statistics are not profile-based, but are computed on all packets addressed to the CM 320.

The CM 320 can be capable of providing the following downstream performance metrics:
Uncorrectable full-length codewords: Number of full-length codewords that failed BCH decoding.
Correctable full-length codewords: Number of full-length codewords that failed pre-decoding LDPC syndrome check and passed BCH decoding.
Unreliable full-length NCP Codewords: Number of full-length NCP codewords that failed LDPC post-decoding syndrome check.
Unreliable PLC Codewords: Number of PLC codewords that failed LDPC post-decoding syndrome check.
NCP full-length CRC failures: Number of full-length NCP codewords that failed CRC check.
MAC CRC failures: Number of packets that failed MAC CRC check.
Total number of full-length FEC codewords.
Total number of full-length NCP codewords.
Total number of PLC codewords.
Total number of MAC packets.
Start and stop time of analysis period.

The CM 320 can be capable of providing the following downstream FEC summaries on each OFDM channel for each profile being received by the CM 320:
Full-length codeword error ratio vs. time (seconds): Ratio of full-length number of uncorrectable codewords to total number of full-length codewords in each one-second interval for a rolling 10-minute period (600 values).
Full-length codeword error ratio vs. time (minutes): Ratio of number of uncorrectable full-length codewords to total number of full-length codewords in each one-minute interval for a rolling 24-hour period (1440 values).
Ending time of rolling period.
Red/yellow/green summary link status (colors defined in [DOCSIS OSSI v3.1]).

The CM 320 can provide two collection and reporting methods for each error-count metric:
Long-term statistics. The CM 320 always collects metrics in the background for each profile. The codeword (or packet) and error counters are automatically reset once per hour. The previous value of each counter is saved when the counter is reset due to timeout, so that in a steady-state condition a full hour's reading is always available.
Short-term statistics. The CM 320 performs a one-shot measurement with two configured parameters, $N_e$ and $N_c$. The CM 320 reports the results when $N_e$ errors have occurred or $N_c$ codewords have been processed, whichever comes first. This measurement is particularly useful for downstream profile performance measurement.

Downstream Histogram

The purpose of downstream histograms is to provide a measurement of nonlinear effects in the channel such as amplifier compression and laser clipping. For example, laser clipping causes one tail of the histogram to be truncated and replaced with a spike. The CM 320 captures the histogram of time domain samples at the wideband front end of the receiver. The histogram can be two-sided; that is, it encompasses values from far-negative to far-positive values of the samples.

In an embodiment, the CM 320 can be capable of capturing the histogram of time domain samples at the wideband front end of the receiver. The histogram can have a programmable accumulation period of 1 second to 1 minute and a minimum resolution of, for example, 255 bins.

Downstream Profile Performance Metrics

The following measurements are used for both PNM diagnostics and for performance testing of downstream modulation profiles. The data format used to report a given measurement may differ for these two uses.

Uncorrectable full-length codewords
Corrected full-length codewords
MAC CRC codeword errors
NCP LDPC full-length codeword errors
NCP full-length CRC failures
Total number of full-length FEC codewords
Total number of full-length NCP codewords
RxMER per subcarrier
RxMER measurement type per subcarrier
SNR margin for candidate data profile
SNR margin for candidate NCP profile The following upstream PNM actions set forth CMTS 305 and CM 320 functions for obtaining and buffering symbol samples, providing wideband spectrum analysis, obtaining and reporting noise power measurements and statistics, providing equalizer coefficient values, obtaining and reporting forward error correction statistics, and reporting signal histograms for the upstream channel.

Upstream Capture for Quiet Period and Probe Symbol

The purpose of the capture is to view underlying noise and measure plant response, by capturing one or more OFDM symbols during a scheduled quiet period or probe. A quiet period provides an opportunity to view the underlying noise and ingress while no traffic is being transmitted in the OFDM band. An upstream probe provides the partial functionality of a network analyzer, since the input is known and the output is captured. This permits full characterization of the linear and nonlinear response of the upstream cable plant. A list of excluded subcarriers is also provided, in order to fully define the transmitted waveform. The index of the starting sample used by the receiver for its FFT is also reported. In an embodiment, the CMTS 305 can be capable of capturing the samples of one upstream OFDM symbol, including guard time, during an upstream quiet period or probe, and making them available for analysis.

Upstream Triggered Spectrum Capture

The upstream triggered spectrum capture provides a wideband spectrum analyzer function in the CMTS 305 which can be triggered to examine desired upstream transmissions as well as underlying noise/interference during a quiet period. The capture capability herein covers both OFDM and pre-DOCSIS-3.1 upstream channels that may exist in the Upstream Spectrum.

In an embodiment, the CMTS 305 can provide wideband spectrum analysis capability. The CMTS 305 can provide a spectrum analysis span covering up to the full upstream spectrum of the cable plant. The CMTS 305 can provide the ability to trigger the spectrum sample capture using the following modes:

Free running
Trigger on SID (service identifier)
Trigger during quiet period
Trigger on mini-slot count.

Upstream Impulse Noise Statistics

Upstream Impulse noise statistics gather statistics of burst/impulse noise occurring in a selected narrow band. In an embodiment, a bandpass filter is positioned in an unoccupied upstream band. A threshold is set, energy exceeding the threshold triggers the measurement of an event, and energy falling below the threshold ends the event. The threshold may be set to zero, in which case the average power in the band can be measured. The measurement is time-stamped using, for example, the D3.0 field of the 64-bit extended timestamp (bits 9-40, where bit 0 is the LSB), which provides a resolution of 98 ns and a range of 7 minutes.

In an embodiment, the CMTS 305 can provide the capability to capture the following statistics in a selected band up to 5.12 MHz wide:

Timestamp of event
Duration of event
Average power of event.

In an embodiment, CMTS 305 can provide a time history buffer of up to 1024 events.

Upstream Equalizer coefficients

Upstream equalizer coefficients provide access to CM 320 upstream pre-equalizer coefficients, and CMTS 305 upstream adaptive equalizer (post-equalizer) coefficients, which taken together describe the linear response of the upstream cable plant for a given CM 320. The OSSI spec can define summary metrics to avoid having to send all equalizer coefficients on every query.

In an embodiment, the CM 320 can provide the capability to report its upstream pre-equalizer coefficients (full set or summary) upon request. In an embodiment, the CMTS 305 can provide a capability for reporting its upstream adaptive equalizer coefficients associated with a given CM 320 upon request.

Upstream FEC Statistics

Upstream FEC statistics provide for monitoring upstream link quality via FEC and related statistics. Statistics can be taken on codeword error events. The measurement is time-stamped, for example, using bits 21-52 of the extended timestamp. An LDPC codeword that fails post-decoding syndrome check can be labeled "unreliable", but the data portion of the codeword may not contain bit errors; hence the "unreliable codeword" count can tend to be pessimistic. All codewords, whether full-length or shortened, are included in the measurements.

In an embodiment, the CMTS 305 can be capable of providing the following FEC statistics for any single upstream user:

Pre-FEC Error-Free Codewords: Number of codewords that passed pre-decoding syndrome check.
Unreliable Codewords: Number of codewords that failed post-decoding syndrome check.
Corrected Codewords: Number of codewords that failed pre-decoding syndrome check, but passed post-decoding syndrome check.
MAC CRC failures: Number of packets that failed MAC CRC check.
Total number of FEC codewords.
Total number of MAC packets.
Start and stop time of analysis period.

In an embodiment, the CMTS 305 can be capable of providing the following FEC summaries over a period of up to 10 minutes for any single upstream user:

Total number of seconds.
Number of errored seconds (seconds during which at least one unreliable codeword occurred).

Count of codeword errors (unreliable codewords) in each 1-second interval.
Start and stop time of summary period.
Red/yellow/green summary link status (colors defined in [DOCSIS OSSI v3.1]).

Histogram

The purpose the histogram is to provide a measurement of nonlinear effects in the upstream channel such as amplifier compression and laser clipping. For example, laser clipping causes one tail of the histogram to be truncated and replaced with a spike. The CMTS 305 captures the histogram of time domain samples at the wideband front end of the receiver. The histogram is two-sided; that is, it encompasses values from far-negative to far-positive values of the samples.

In an embodiment, the CMTS 305 can be capable of capturing the histogram of time domain samples at the wideband front end of the receiver. The histogram can have a programmable accumulation period of 1 second to 1 minute and a minimum resolution of 255 bins.

Figure 12:
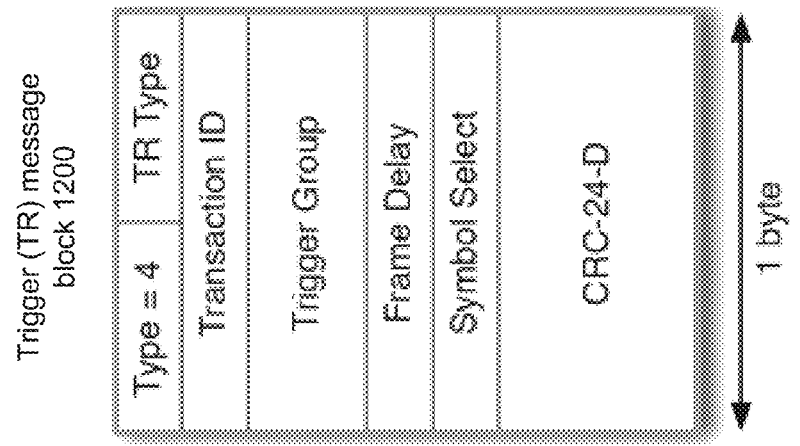
FIG. 12 illustrates an embodiment of a trigger message block 1200.

FIG. 12 illustrates an embodiment of a trigger message block 1200. An example format of a trigger message block (MB) is shown for use in conjunction with one or more functions and features described in conjunction with FIGS. 1-11.

In one mode of operation, the Trigger MB 1200 provides a mechanism for synchronizing an event at the CMTS 305 and CM 320, such as the CM 320 and CMTS 305 via command data 304 or other data exchange. In particular, the trigger message block 1200 can be used to trigger the implementation of a one or more of the PNM features previously described. In accordance with this example, the CMTS 305 inserts a TR MB into the PLC and performs an action at a specific time aligned with the PLC frame. When the CM 320 detects the TR MB, it performs an action at the same relative specified time aligned with the PLC frame received at the CM 320. As discussed in conjunction with FIG. 3, when the probe symbol is a data symbol, synchronization is required to ensure that the same symbol is captured at the transmitter and receiver. Such synchronization may be provided by a trigger MB 1200, for example, via a Symbol Select function.

The fields of trigger message block 1200 are shown in the table below in accordance with an embodiment.

| Field | Size | Value | Description |
| --- | --- | --- | --- |
| Message Block Type | 4 bits | 4 | Trigger MB |
| Trigger Type | 4 bits | 1 | Identifies type of action to perform |
| Transaction ID | 1 byte | | Increments on each TR MB sent |
| Trigger Group | 2 bytes | | Group for unicast, multicast and broadcast triggers |
| Frame Delay | 1 byte | 2 | How many frames to wait before performing action |
| Symbol Select | 1 byte | 1 | Which symbol in PLC frame to perform action upon |

In this embodiment, the Trigger Type field identifies the type of measurement to be performed. Value is unsigned integer from 0 to 15, with default=1. The Transaction Identifier field increments by one on each trigger message that is sent, rolling over at value 255. Value is unsigned integer from 0 to 255. The Trigger Group field identifies which group of CMs can respond to the trigger message.

In an example of operation, a CM 320 responds to the trigger message if it has been configured as trigger-enabled and it has membership in the specified Trigger Group. If the CM 320 has not been configured as trigger-enabled, it does not respond to trigger messages. The Frame Delay field tells the CM 320 how many frames to wait before performing the specified action. Frame Delay=1 (not permitted) can indicate to perform the action in the next PLC frame after the frame containing the TR MB; Frame Delay=2 indicates to perform the action in the second PLC frame after the TR MB; etc. The value is an unsigned integer from 2 to 31, with default=2. Values 0 and 1 are not permitted as they may not give the CM 320 adequate time to prepare for the action.

The Symbol Select field tells the CM 320 which symbol in the specified PLC frame to perform the action upon. Symbol Select=0 indicates to perform the action on the OFDM symbol aligned with the first PLC preamble symbol; Symbol Select=1 indicates to perform the action on the OFDM symbol aligned with the second PLC preamble symbol; Symbol Select=8 indicates to perform the action on the OFDM symbol aligned with the first symbol after the PLC preamble, which corresponds to the first PLC data symbol; and so on. The value is an unsigned integer from 0 to 127, with default=1. In addition to selecting a symbol, this parameter by convention points to the time instant at the beginning of the selected symbol. (Note that, by contrast, DOCSIS PHY3.1 numbers the first PLC data symbol as symbol 0, as it numbers the data field only, excluding the preamble.)

When commanded to do so via a management object, the CMTS 305 can insert a single TR MB into the PLC. The CMTS 305 can position the trigger MB in the PLC frame immediately after the timestamp MB but before any EM MBs, and before the MC MB. The CMTS 305 can increment the Transaction ID field in each successive TR MB it sends. When trigger-enabled via a management object, the CM 320 can detect the TR MB.

For example, for a Downstream Symbol Capture measurement, the following CMTS 305 requirements apply:
The CMTS 305 can set Trigger Type=1.
The CMTS 305 can capture and report the downstream symbol specified in the TR MB.
The CMTS 305 can report the timestamp from the PLC frame pointed to by the trigger message.
The CMTS 305 can report the Transaction ID.

For example, for a Downstream Symbol Capture measurement, the following CM 320 requirements apply:
When it is trigger-enabled and a member of the Trigger Group specified in the TR MB, the CM 320 can capture and report the downstream symbol specified in the TR MB.
The CM 320 can report the Transaction ID.

Application of Trigger Message Block

This TR MB message 1200 can be used in accordance with the following example. In order for a CM 320 to respond to the TR MB, the CM 320 is first awakened if it is in sleep mode. The CM 320 is configured to enable triggering. The CM 320 is configured to belong to a Trigger Group. The CMTS 305 inserts a single trigger message per measurement including a Trigger Group parameter associated with the group of CMs that are intended to perform the measurement. The message is acted upon only by those CMs which are trigger-enabled and reside in the appropriate Trigger Group; unicast, multicast and broadcast groups are supported.

In one mode of operation, the TR MB is to enable a Downstream Symbol Capture measurement. The goal of this measurement is to capture the same OFDM symbol at the CMTS 305 and CM 320. The captured symbol is a normal symbol (not a special test symbol or altered in any way) carrying downstream QAM data traffic. The entire OFDM symbol is captured across all subcarriers, in the form of I and Q samples, at the CMTS 305 and CM 320. The PLC frame is used only as a timing mechanism to define the location of the desired symbol in the downstream OFDM symbol stream. For Downstream Symbol Capture, the Trigger Type parameter is set to 1.

An OSS management station, such as network analyzer 1100 or other OSS device, initiates the measurement via a write to a CMTS management object. The CMTS 305 inserts the TR MB in the PLC channel of the specified OFDM downstream channel, waits the number of PLC frames defined by the Frame Delay parameter, and captures the OFDM symbol specified by the Symbol Select parameter. This capture can result in a number of frequency-domain data points equal to the FFT length in use (e.g., 4096 or 8192), 16 bits in width for each of I&Q, with LSBs padded with zeroes if required.

A trigger-enabled CM 320 addressed by the Trigger Group parameter detects the presence of the TR MB in the PLC, waits the number of PLC frames defined by the Frame Delay parameter, and captures the OFDM symbol specified by the Symbol Select parameter. This capture will result in a number of time-domain data points equal to the FFT length in use (e.g., 4096 or 8192), 16 bits in width for each of I&Q, with LSBs padded with zeroes if required.

The CMTS 305 captures the 8-byte extended timestamp value present in the PLC frame in which the OFDM symbol was captured, and returns it to the management station along with the captured OFDM symbol samples; this aids in identifying the captured data, and permits comparing the capture time with other time-stamped events such as burst noise and FEC errors. The CMTS 305 and CM 320 both return the Transaction ID to the management station along with the captured data; this provides a mechanism for grouping CMTS and CM data from the same symbol for analysis, and for detecting missed captures. If no data was successfully captured by the CMTS 305 and/or a CM 320, that condition is reported to the management station in lieu of data, along with the Transaction ID if available. The data can stored locally in the CMTS 305 and CM 320, and returned to the management station based on a command issued by the management station to a management object in the CMTS 305 and CM 320.

In an embodiment, an OSSI specification can limit how many Trigger messages can be sent before the captured data is read out from the CM 320 by the OSS, in order to limit CM memory requirements. The recommended initial default value is a maximum of one capture at a time in a given CM 320. If a new Trigger message arrives before the previous captured data has been read out, the CM 320 can optionally ignore the new trigger and report that condition.

In an embodiment, the PNM system described herein synchronizes an upstream quiet time capture with a CMTS downstream symbol capture. The reason is to measure common path distortion (CPD), that is, nonlinearities such as corroded connectors, which form diodes that cause the downstream signals to be modulated into the upstream.

In one mode of operation, these upstream and downstream measurements are synchronized based on a timestamp value. For example, a PNM station such as network analyzer 1100 or other OSS management station sends a command to the CMTS 305 to trigger both captures. The MIB can ask for a capture during a quiet time or upstream user transmission, and the CMTS 305 can convert that into a timestamp value. In an embodiment, the DOCSIS 3.0 timestamp (represented bits 9-40 of the DOCSIS 3.1 extended timestamp) can be used in this regard.

For example, the scheduler schedules a quiet period in the upstream in an arbitrary future mini-slot, and knowing the timestamp/mini-slot snapshot offset, the timestamp value t1 corresponding to a symbol in the middle of the quiet period is known. The CMTS 305 captures an OFDM symbol period in both the upstream and the downstream when the PLC timestamp=t1. In this fashion, a CMTS 305 can capture a downstream symbol at a predetermined time indicated by a known future PLC timestamp value.

In a mode of operation, the CMTS software is operable to determine how a timestamp translates into a specific symbol on the PLC channel for the downstream, and into a specific mini-slot count on the upstream. In particular, the CMTS software separately configures the downstream and upstream capture functions so that they are aligned. In this example, the CMTS and CM capture hardware in the downstream need not be aware of the timestamp value—these can still look for "symbol X after PLC frame Y". In this example, the CM 320 transmitter can set the trigger message relative to the timestamp to enable the synchronization.

In an example, the CMTS 305 provides synchronization of the US symbol capture by providing a unique allocation of the quiet time for both the CM 320 and the CMTS 305. In particular, the CMTS 305 can use P-MAP (instead of the mini-slot) with a capture flag or a dedicated SID to specify the symbol used.

In various embodiments, the burst receiver in the upstream channel captures more than one OFDM symbol (ideally 3-4 in succession including guard times). This extra capture length can provide margin to account for any offset in the time alignment between upstream and downstream symbol boundaries and to ensure that the period of interest of the particular OFDM symbol being synchronized is captured for analysis.

Figure 13:
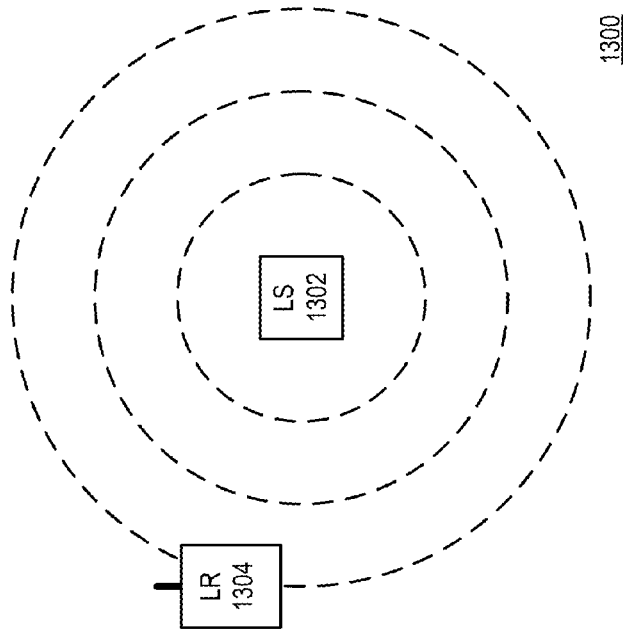
FIG. 13 illustrates an embodiment 1300 of a cable plant with leakage source 1302.

FIG. 13 illustrates an embodiment 1300 of a cable plant with leakage source 1302. While the prior discussion has focused on the probe symbol transmissions for a broad range of functions including proactive network maintenance and network optimization, probe symbols and other OFDM symbols can be inserted for detecting and/or locating a leakage source 1302 in a communication channel 199 such as cable plant 310. The leakage source 1302 can be an amplifier housing, connector, improper cable splice or connection, break in a cable line, un-terminated cable, or other source of RF leakage from a cable, such as cable plant 310 or other channel 199. In particular, the leakage source 1302 is part of a transmission system where OFDM probe symbols are transmitted. The leakage receiver 1304 operates by detecting these OFDM probe symbol transmissions.

In an embodiment, the probe symbols can be wideband probe symbols, such as any of the active probe symbols presented in conjunction with FIGS. 7-9. The leakage receiver 1304 includes a matched filter that is matched to the active probe symbol or other signal processing to detect probe symbol transmissions. In one mode of operation, received signal strength of the probe symbols is used by the leakage receiver 1304 to detect and locate the leakage source. The leakage receiver 1304 optionally includes a directional antenna that is used to identify a direction from the leakage receiver 1304 to the leakage source 1302 to further aid in locating the leakage source 1302.

Consider, for example, a probe symbol that occupies the full 192 MHz OFDM bandwidth for 1 OFDM symbol of length 20 microseconds. The form of probe symbol can be coherently received in a matched filter. It is equivalent to 3800 QAM values in a traditional OFDM transmission, each with 40 dB SNR inside the cable. Allowing 15 dB SNR to reliably detect the signal presence in the leakage detector provides a processing gain of 40 dB-15 dB+10*log 10(3800) =61 dB to overcome the leakage path loss.

In a further mode of operation, the leakage receiver 1304 analyzes the leakage signals from leakage source 1302 as a function of frequency. This leverages the uncorrelated nature of LTE-band leakage and lower frequency (aeronautical band) leakage. Also the frequency content helps indicate the mechanism causing the leak, as different size apertures (cracks, loose connectors, etc.) correspond to different wavelengths of RF leakage energy. It can be noted that the leakage receiver 1304 can be a single purpose device or incorporated into an adjunct device that is coupleable to a smartphone, table computer, laptop or other portable device or otherwise is incorporated in a smartphone, table computer, laptop, automotive receiver or other portable device.

Figure 14:
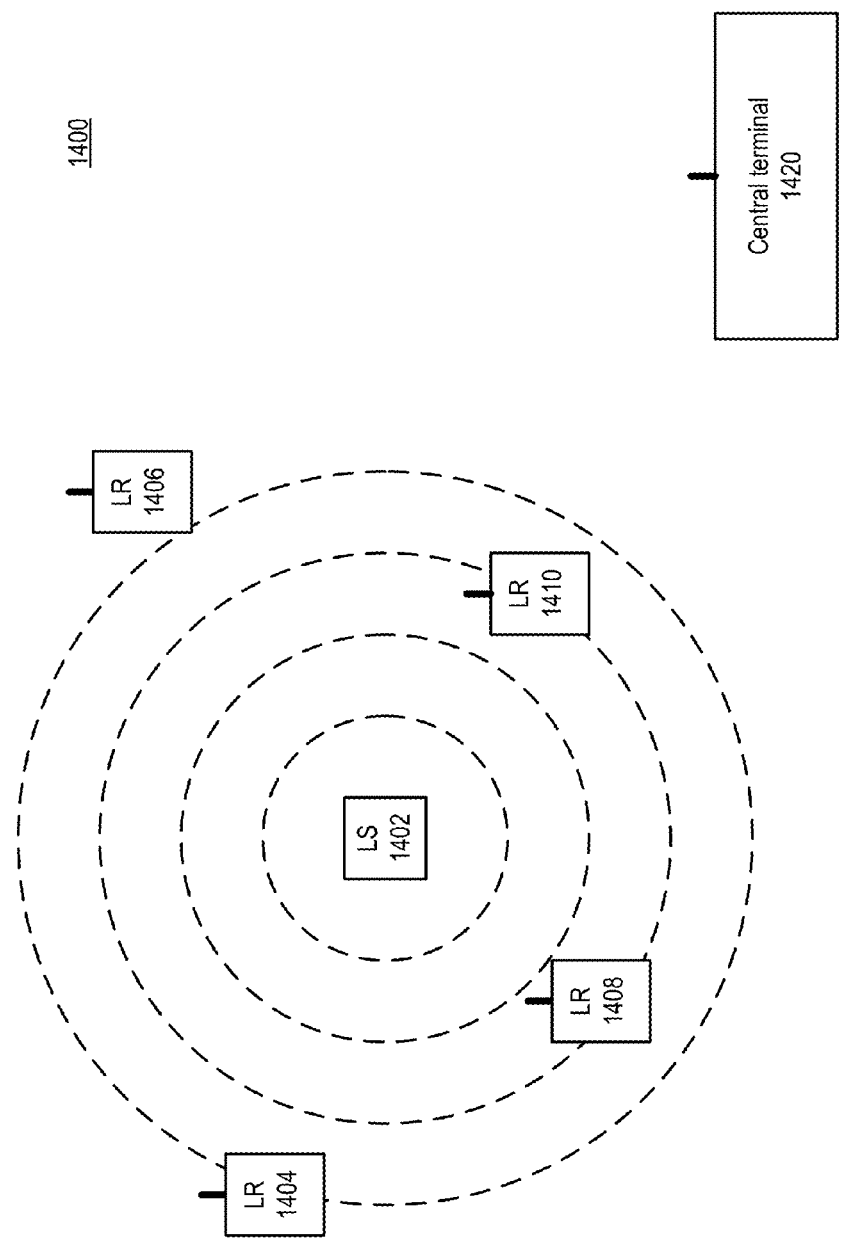
FIG. 14 illustrates an embodiment 1400 of a cable plant with leakage source 1402.

FIG. 14 illustrates an embodiment 1400 of a cable plant with leakage source 1402. Like the leakage source 1302, leakage source 1402 can be an amplifier housing, connector, improper cable splice or connection, break in a cable line, un-terminated cable, or other source of RF leakage from a cable, such as cable plant 310 or other channel 199. In particular, the leakage source 1402 is part of a transmission system where OFDM probe symbols are transmitted. The leakage receivers 1404, 1406, 1408 and 1410 operate by detecting OFDM probe symbol transmissions.

In an embodiment, the probe symbols can be wideband probe symbols, such as any of the active probe symbols presented in conjunction with FIGS. 7-9. The leakage receivers 1404, 1406, 1408 and 1410 include a matched filter that is matched to the active probe symbol or other signal processing to detect probe symbol transmissions.

In addition to or as an alternate to operating as leakage receiver 1304, each of the leakage receivers 1404, 1406, 1408 and 1410 includes a GPS receiver that provides both a stable time base and GPS location of the receiver. When probe symbols are detected by the leakage receiver, a time of arrival (TOA) is calculated at each receiver and used in conjunction with the location of each receiver to pinpoint the location of the leakage source 1402. Leakage data from each of the leakage receivers 1404, 1406, 1408 and 1410 is collected by a central terminal 1420, such as a master station, fixed station or other receiver and used to calculate the location of the leakage source 1402. In particular, the central terminal employs similar techniques to GPS location—but with TOA data from multiple receivers as opposed to TOA data at a receiver from multiple sources.

Figure 15:
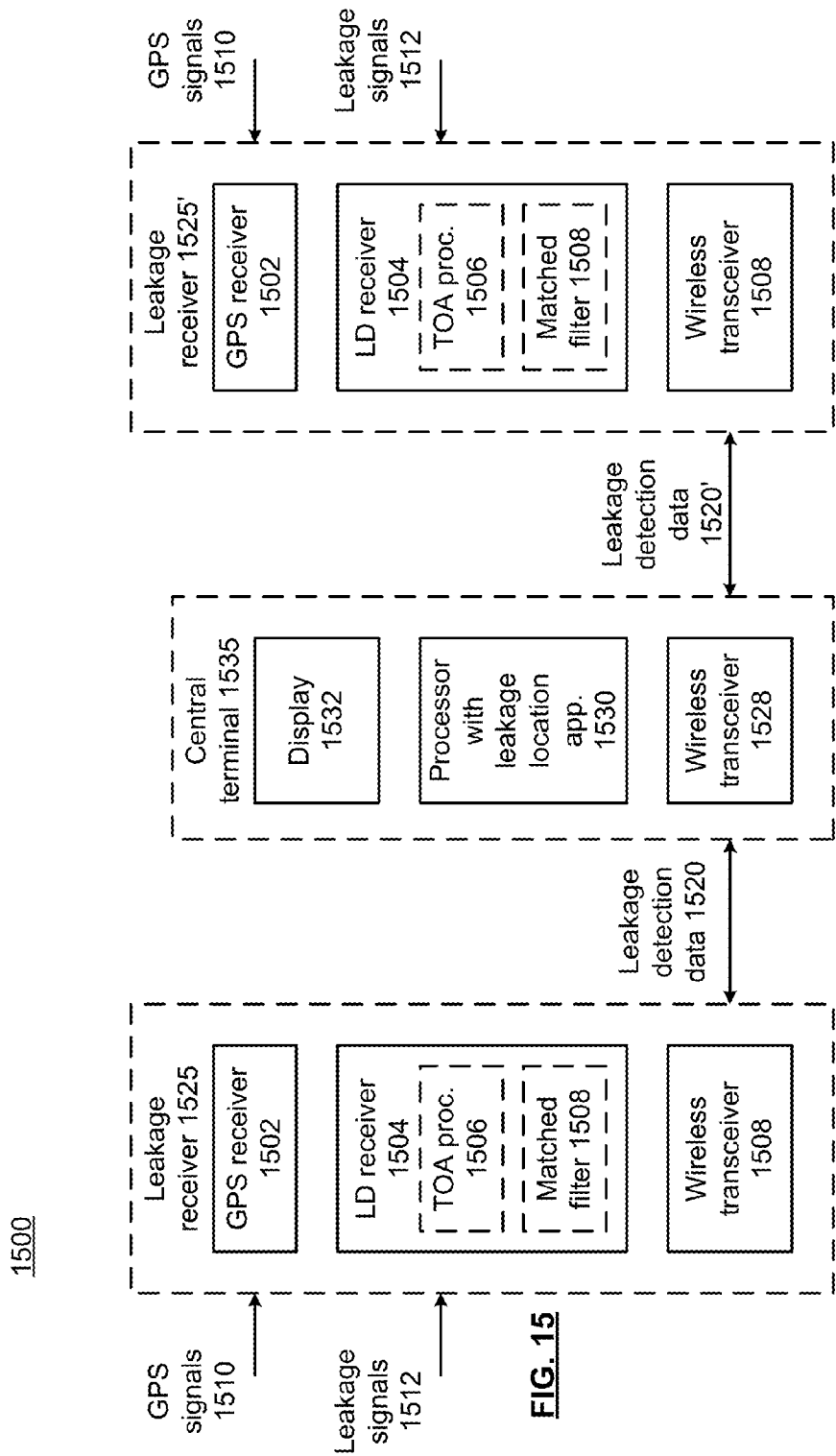
FIG. 15 illustrates an embodiment 1500 of a leakage receiver 1525 and central terminal 1535.

FIG. 15 illustrates an embodiment 1500 of a leakage receiver 1525 and central terminal 1535. In particular the central terminal 1535 is an example of central terminal 1420 and leakage receivers 1525 and 1525' present two examples of two leakage receivers 1404, 1406, 1408 and 1410.

The leakage receivers 1525 and 1525' each include a leakage detection receiver 1504 having a matched filter 1508 that is matched to the active probe symbol to detect probe symbol transmissions in leakage signals 1512. In addition, the leakage receivers 1525 and 1525' further include a GPS receiver 1502 that provides both a stable time base for TOA calculations and that processes GPS signals 1510 to generate GPS location data corresponding to the position of the receiver.

When probe symbols are detected by the leakage detection receiver 1504, a time of arrival (TOA) is calculated at each receiver via the TOA processor 1506. The TOA data and the corresponding GPS position are incorporated in leakage detection data 1520 and 1520' that is sent via the wireless transceivers 1508 to the central terminal 1535. As shown, the central terminal 1535 includes wireless transceiver 1528 for coordinating the reception of, and receiving, the leakage detection data 1520 and 1520'. While described in conjunction with wireless reception a wired interface such as a universal serial bus interface, Ethernet interface, an Internet connection or other interface, either wired or wireless can optionally be employed.

The central terminal 1535 further includes a processing unit that executes leakage location application 1530 and a display device 1532 that provides a graphical user interface and aids the user of central terminal 1535 in identifying the location of a leakage source such as leakage source 1402. In operation, the leakage location application 1530 operates based on leakage detection data from 2, 3, 4 or more leakage receivers at multiple locations to pinpoint the location of the leakage source 1402. Leakage data from each of the leakage receivers 1404, 1406, 1408 and 1410 is used by the leakage location application 1530 to calculate the location of the leakage source 1402. In particular, the leakage location application 1530 employs similar techniques to GPS location—but with TOA data and GPS coordinates from multiple receivers as opposed to TOA data at a receiver from multiple sources.

Figure 16:
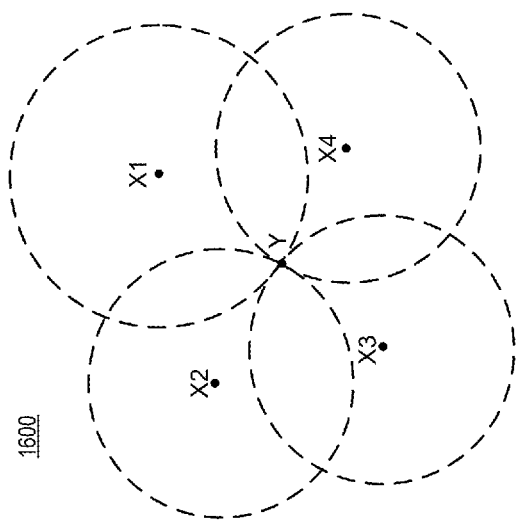
FIG. 16 illustrates an embodiment 1600 of the location of a leakage source via a plurality of leakage detection data.

FIG. 16 illustrates an embodiment 1600 of the location of a leakage source via a plurality of leakage detection data. In this example, X1, X2, X3 and X4 represent the coordinate positions of four leakage receivers, such as 1404, 1406, 1408 and 1410. As discussed in conjunction with FIGS. 14 and 15, these coordinate positions can be generated by a GPS receiver of each of the leakage receivers. The dashed circle from each coordinate position (X1, X2, X3, X4) represents a distance from each coordinate derived from the TOA data generated by corresponding leakage receiver and the corresponding speed of signal transmissions in air. While the TOA data itself is non-directional, the leakage location application 1530 combines the leakage detection data from all four leakage receivers to calculate the location Y of the leakage source 1302. As shown, the location Y of leakage source 1302 corresponds to the point of intersection of the four dashed circles. As will be understood by one skilled in the art, that while the presence of errors in the GPS coordinate positions (X1, X2, X3, X4) and the corresponding TOA data from each leakage receiver may dictate that an exact intersection may not be present, the identification of an intersection region and its midpoint may be used to estimate the location Y and further to provide a way to gauge the accuracy of the estimate.

Figure 17:
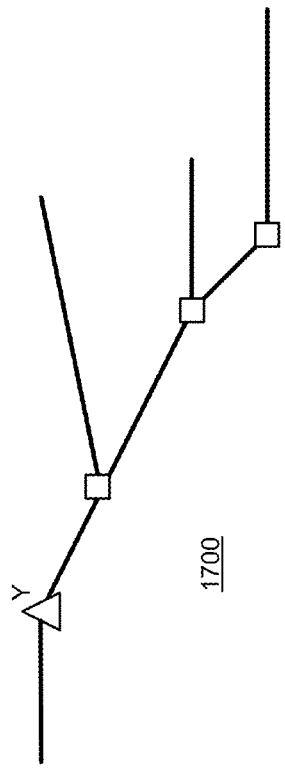
FIG. 17 illustrates an embodiment 1700 of the location of a leakage source in accordance with a cable plant map.

FIG. 17 illustrates an embodiment 1700 of the location of a leakage source in accordance with a cable plant map. In particular, the position of certain components of a cable plant, such as cable plant 310, are superimposed on a layout map. In the example shown, dark lines represent buried or overhead cable lines, and other symbols are used to represent known sources of possible RF signal leakage. In particular, squares represent connectors and the triangle represents an amplifier housing. This cable plant layout map can be used in conjunction with the leakage location application 1530 to aid in identifying and locating a leakage source 1402.

In one example of operation, the cable plant layout map is displayed on display 1532 of central terminal 1535 to aid the user of the central terminal in locating the leakage source 1402. In the example shown, the calculated position Y is superimposed on the cable plant layout map. The user can visualize that the calculated location Y is near an amplifier housing that can be the source of the leak. In a further example, the leakage location application 1530 automatically identifies likely sources of leakage in proximity to a calculated position Y and highlights a likely source or several likely sources, as applicable, to the user.

Returning again to FIG. 14, in another embodiment, egress monitoring signals, such as any of the active probe symbols presented in conjunction with FIGS. 7-9 are inserted in downstream and/or upstream transmissions. The leakage receiver 1404 includes a matched filter that is matched to the active probe symbol or other signal processing to detect probe symbol transmissions. In one mode of operation, received signal strength of the probe symbols is used by the leakage receiver 1404 to detect and locate the leakage source. The leakage receiver 1404 optionally includes a directional antenna that is used to identify a direction from the leakage receiver 1404 to the leakage source 1402 to further aid in locating the leakage source 1402.

Consider, for example, a probe symbol that occupies the full 192 MHz OFDM bandwidth for 1 OFDM symbol of length 20 microseconds. The form of probe symbol can be coherently received in a matched filter. It is equivalent to 3800 QAM values in a traditional OFDM transmission, each with 40 dB SNR inside the cable. Allowing 15 dB SNR to reliably detect the signal presence in the leakage detector provides a processing gain of 40 dB−15 dB+10*log 10(3800)=61 dB to overcome the leakage path loss.

In a further mode of operation, the leakage receiver 1404 analyzes the leakage signals from leakage source 1402 as a function of frequency. This leverages the uncorrelated nature of LTE-band leakage and lower frequency (aeronautical band) leakage. Also the frequency content helps indicate the mechanism causing the leak, as different size apertures (cracks, loose connectors, etc.) correspond to different wavelengths of RF leakage energy. It can be noted that the leakage receiver 1404 can be a single purpose device or incorporated into an adjunct device that is coupleable to a smartphone, table computer, laptop or other portable device or otherwise is incorporated in a smartphone, table computer, laptop, automotive receiver or other portable device.

Consider a further embodiment where, in addition or as an alternative to the active probe symbols, a plurality of phase-continuous OFDM pilot tones are inserted in either the upstream or the downstream transmission. In particular, pilot tones such as continuous wave pilots can be generated for egress monitoring, phase-noise measurement, the detection of sub-carrier spacing and/or for other testing and measurement purposes.

In-band continuous pilot tones can be generated, which if properly chosen in frequency, result in true CW or substantially true CW, even in the presence of a cyclic prefix. For example, the pilot symbols can be true CW (unmodulated), that is, when viewed on a spectrum analyzer they can be seen as spectral lines. The CW pilots can still be used as an OFDM pilot for acquisition and tracking, since the phase can be known. The CW pilot can remain orthogonal to the other OFDM tones. For egress testing, link loss (leakage from cable, plus path loss) can be a limiting factor, not the transmit SNR of the CW tone. Hence in-band pilot tones can optionally be implemented with no guard band. These in-band pilot tones can clearly be detected by leakage receiver 1404 with time averaging over thousands of OFDM symbols.

In an embodiment, the CMTS 305 or CM 320 assigns a number of OFDM tones (5 to 10 for example) in either the upstream or downstream as carrier wave (CW) pilots to be continuously transmitted across all symbols. Each CW pilot can be the same as any other continuous pilots except for a continuous-phase constraint across OFDM symbols. Since the cyclic prefix (and or guard interval) in each OFDM symbol adds a phase shift due to its run length, the CW pilot can take this additional phase shift into account and start at the correct phase in the next OFDM symbol.

This form of pilot can be coherently received via a matched filter that detects the presence of these RF CW tones to measure plant leakage. Time averaging can be used in detection by the leakage receiver 1404 to bring the tone up out of the OFDM background noise. In a further embodiment, leakage receiver 1404 can be synchronized to the OFDM frame, and the CW pilot tones can be detected based on their orthogonality to other OFDM symbols. In this case, little or no time averaging may be necessary.

Consider the application of such CW pilots to a CMTS 305 and/or CM 320 that operates in accordance with DOCSIS 3.1. Legacy sniffer equipment in DOCSIS 3.0 inserts tones which are about 9 dB lower in spectral density than the QAM signals in the cable plant, when measured in a 50 kHz BW, and which are located between QAM signals. In one mode of operation, the continuous pilots are boosted 6 dB above the OFDM data subcarriers. If OFDM and legacy QAM spectral densities are about equal, the continuous phase CW pilots can be 9+6=15 dB stronger than legacy sniffer tones. This can be very effective for leakage detection—even in the presence of LTE-band leakage and lower frequency (aeronautical band) leakage.

It can be noted that placing egress monitoring signals in the upstream (such as CW tones at known frequencies or an upstream full-band probe), as well as in downstream transmissions allow leaks to be quickly found and repaired. Upstream transmissions can be traced to a given location since only one upstream Tx is transmitting a full-band probe at a time. This is better for locating the problem than downstream, where the signal goes to all users.

In addition to the use of unmodulated pilot tones, some modulation can be employed. For example, a constant value such as a point taken from a QAM constellation, AM, BPSK or other modulation technique can be used to modulate the subcarrier. In one mode of operation, one large value of a constellation can be used. In another mode of operation, the modulation can be selectable between a set of programmable modulation values.

While the discussion above has focused on in-band pilots, the transmitter can employ one or more tone generators to provide out-of-OFDM-band tones and/or OFDM-band-edge tones. For example, use 2, 3, 4, . . . CW generators such as numerically controlled oscillators (NCOs) or other tone generators can be employed to generate pilot tones. If these pilot tones are generated on 50 kHz or 25 kHz centers or otherwise to match OFDM FFT bin spacing, then the pilot tones can be orthogonal with the OFDM symbols.

Consider a case where two or three pilot tones are generated. By selecting the amplitude and phase of these tones, an AM signal can be generated that can be easily received, demodulated and recognized by field equipment such as leakage receiver 1304. With the CMTS 305 locked to stable reference such as a DTI server and/or GPS, the AM signal can be easily acquired with little frequency search. The use of such signals for egress monitoring promotes easy reception and measurement by simple, standard field equipment.

In addition to the use of such CP pilots discussed above for leakage detection or other egress monitoring, the CW pilot tones can be employed in conjunction with CMTS 305 and CM 320 in the upstream and/or downstream transmissions for phase noise testing, the detection of sub-carrier spacing and/or other test and measurement purposes. For phase noise testing, one CW generator may be sufficient to generate a single tone for measurement on phase-noise test set or other equipment. For measuring OFDM subcarrier spacing, two tones can be generated with subcarrier frequency spacing. The frequency difference can be measured using standard test equipment.

Figure 18:
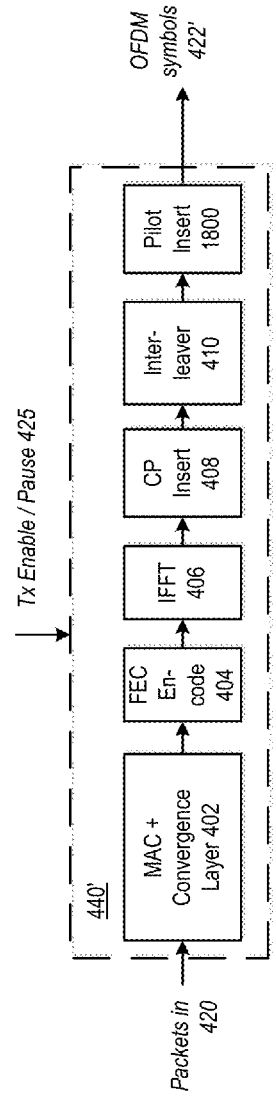
FIG. 18 illustrates an embodiment of a baseband processor or other data processing element 440'.

FIG. 18 illustrates an embodiment of a baseband processor or other data processing element 440'. In particular, baseband processor or other data processing element 440' includes similar functions and features described in conjunction with FIG. 4 that are referred to by common reference numerals.

In particular, IFFT 406 and/or pilot insert block 1800 generates and inserts the OFDM pilot tones in the OFDM symbol stream 422' for transmission. For example, IFFT 406 can operate to insert in-band CW pilot tones. The IFFT 406 generates a number of OFDM tones (5 to 10 for example) in the downstream as carrier wave (CW) pilots to be continuously transmitted across all symbols. Each CW pilot is generated the same as other continuous pilots except for a continuous-phase constraint across OFDM symbols. Since the cyclic prefix in each OFDM symbol adds a phase shift due to its run length, the IFFT 406 or pilot insertion block 1800 can take this additional phase shift into account and start the CW pilot at the correct phase in the each OFDM symbol for phase coherence across the sequence of OFDM symbols.

In one embodiment, the baseband processor or other data processing element 440' is optionally responsive to transmit enable/pause control 425 to pause processing to insert probe symbols in the OFDM symbol stream. When such probe symbols are implemented, the CW pilots may or may not be included.

Consider a mode of operation where tones are generated by sending a +1 to the IFFT 406 for each of the subcarriers located at (in the complex baseband) at 0 Hz and multiples of Nfft/CP within the band. For example if Nfft=4096 and CP=256, sending a +1 at subcarriers located at 0 Hz, 16*50 KHz, 32*50 KHz, . . . results in discrete tones at RF without modulation or time discontinuity. To double the number of possible valid locations for inserting a tone, a BPSK constellation can be employed and alternating values can be used (+1 and −1).

Consider a mode of operation for egress monitoring where CW pilots are inserted via IFFT 406 in the midst of the OFDM data subcarriers—optionally with no guard band around the pilots. In this application, time averaging can be applied in the leakage receiver 1304. Consider the example with a 4K IFFT, CP=256, and Window=128 and 15 continuous pilots inserted with 2× pilot boosting; 8 on positive frequency are set on subcarriers that generate CW tones, 7 on negative frequency are set to subcarrier that ends up with a 180 degree inversion from symbol to symbol. The pilots are modulated by a BPSK sequence in frequency direction but static in the time direction. Simulation results for a power spectral density of 1600 FFT symbol periods (note: 1600*(4096+256) is approximately 7 million complex samples at 204.8 MHz) with 50 KHz RBW, indicate that the pilots show as +6 dB spikes above nominal on positive frequencies and +3 dB above nominal on negative frequencies. This indicates that CW pilots can be used with no guard band and will be clearly detectable by a receiver with time averaging over thousands of OFDM symbols. While described above without a guard band, a guard band that includes some number of subcarriers around each CW pilot can likewise be implemented.

In another mode of operation, the IFFT 406 generates tones that are modulated [+1, −1, +1, −1 . . . ] or [1, 1, 1, 1, . . . ] at 204.8 MHz at the IFFT output, which creates a tone at either Fc+102.4 MHz or Fc after upconverting to a carrier frequency Fc. This scheme can be well-suited for phase noise testing.

The optional pilot insert block 1800 can include a one or more NCOs for generating one or more out-of-OFDM-band tones and/or OFDM-band-edge tones that are added to the OFDM stream and summed with the output of the IFFT 406 after cyclic prefix insertion. This combined stream that includes the additional tones is modulated for transmission via a modulator, such as modulator 414 presented in conjunction with FIG. 4. While the pilot insert block 1800 is shown schematically as following CP insert 408 and interleaver 410, other orderings are likewise possible. For example, the pilot insertion block 1800 includes 4 complex NCOs running on the 204.8 MHz clock summed to the output of the IFFT (after CP insertion). This can be used for both testing phase noise and egress monitoring. BSK modulation (+1, −1) can be applied to the tones or DC (no modulation).

Whether tones are generated in-band via IFFT 406 or by optional pilot insert block 1800 as out-of-OFDM-band or OFDM-band-edge tones, these tones can be used for cable plant leakage detection, phase noise testing, the detection of sub-carrier spacing and/or other test and measurement purposes.

Figure 19:
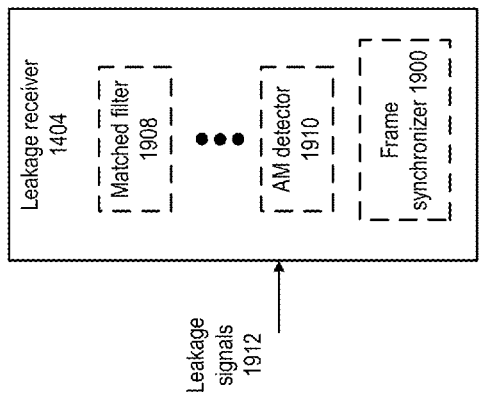
FIG. 19 illustrates another embodiment of a leakage receiver 1404.

FIG. 19 illustrates an embodiment of a leakage receiver 1404. The leakage receiver 1404 includes a plurality of matched filters 1908 that are matched to the active probe symbols and/or CW pilot tones to detect probe symbol transmissions in leakage signals 1912. Consider the example discussed in conjunction with FIG. 14 where the active probe symbols take the form of phase-continuous at a number of OFDM pilots in the downstream transmission. The matched filters detect the presence of these RF CW tones to measure plant leakage. Time averaging can be used in detection by the leakage receiver 1404 to bring the tone up out of the OFDM background noise. In a further embodiment, leakage receiver 1404 can be synchronized to the OFDM frame via optional frame synchronizer 1900 that operates in a similar fashion to corresponding portions of receiver 490 presented in conjunction with FIG. 4. In this case, the CW pilot tones can be detected based on their orthogonality to other OFDM symbols. In this case, little or no time averaging may be necessary.

Consider the case discussed in conjunction with FIG. 14 where two or three pilot tones are generated. By selecting the amplitude and phase of these tones, an AM signal can be generated that can be received, demodulated and recognized by leakage receiver 1404 via AM detector 1910. With the CMTS 305 locked to stable reference such as a DTI server and/or GPS, the AM signal can be easily acquired with little frequency search. The use of such signals for egress monitoring promotes easy reception and measurement by simple, standard field equipment.

As discussed in conjunction with FIG. 18, CW pilots can be inserted via IFFT 406 in the midst of the OFDM data subcarriers—optionally with no guard band around the pilots. Consider the case with a 4K IFFT, CP=256, and Window=128 and 15 continuous pilots inserted with 2× pilot boosting; 8 on positive frequency are set on subcarriers that generate CW tones, 7 on negative frequency are set to subcarrier that ends up with a 180 degree inversion from symbol to symbol. The pilots are modulated by a BPSK sequence in frequency direction but static in the time direction. In this application, time averaging can be applied in the leakage receiver 1404 in conjunction with matched filters 1908 that are tuned to the frequencies of the inserted tones. In the alternative, traditional FFT techniques can be used to detect the presence of the pilot tones in the received spectrum.

FIG. 20 illustrates an embodiment of a method. In particular, a method is presented for use with one or more functions and features described in conjunction with FIGS. 1-19. Step 2000 includes generating a plurality of orthogonal frequency division multiplexed (OFDM) symbols from a data packet. Step 2002 includes generating a probe symbol, as one of a plurality of probe symbol types. Step 2004 includes selectively inserting the probe symbol within the plurality of OFDM symbols, at a pre-defined probe symbol location to form a symbol stream for transmission via a cable plant.

In an embodiment, the plurality of probe symbol types include one or more types of an active probe symbol and/or a quiet probe symbol. The plurality of probe symbol types can include a probe symbol for locating leakage in the cable plant. The plurality of OFDM symbols include at least one pilot tone for locating leakage in a cable plant associated with the CMTS. The at least one pilot tone can be a carrier wave pilot that is phase continuous over the plurality of OFDM symbols. The plurality of OFDM symbols can include at least one pilot tone for phase noise testing and the detection of sub-carrier spacing.

FIG. 21 illustrates an embodiment of a method. In particular, a method is presented for use with one or more functions and features described in conjunction with FIGS. 1-20. Step 2100 includes generating a pause signal. Step 2102 includes pausing the generation of the OFDM symbols in response to the pause signal, wherein the probe symbol is selectively inserted in the plurality of OFDM symbols, in response to the pause signal.

It is noted that terminologies used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries can be defined as long as the certain significant functions are appropriately performed. Similarly, flow diagram blocks may also have been arbitrarily defined herein to illustrate certain significant functionality.

To the extent used, the flow diagram block boundaries and sequence can have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

In a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A cable modem that communicates with a cable modem termination system (CMTS) via a cable plant, the cable modem comprising:
    a cable interface configured to receive, via a downstream channel from the CMTS, a plurality of orthogonal frequency division multiplexed (OFDM) symbols of a data packet, and a physical layer link channel (PLC) message block that indicates a full OFDM symbol of the plurality of OFDM symbols; and
    a data processing module configured to capture the full OFDM symbol received via the downstream channel as capture data and wherein the capture of the full OFDM symbol received via the downstream channel is synchronized via the PLC message block received via the downstream channel.

2. The cable modem of claim 1 wherein the data processing module is further configured to generate feedback data that includes the capture data and wherein the cable interface sends the feedback data, via an upstream channel to the CMTS, for analysis.

3. The cable modem of claim 2 wherein the analysis includes characterization of linear and nonlinear response of the downstream channel.

4. The cable modem of claim 1 wherein a location of the full OFDM symbol in the data packet is determined via a symbol select field of the PLC message block.

5. The cable modem of claim 1 wherein the capture data includes I and Q samples of the full OFDM symbol.

6. The cable modem of claim 1 wherein the capture data includes I and Q samples of the full OFDM symbol not including a guard interval.

7. The cable modem of claim 1 wherein the capture data includes at least a bit indicating if receiver windowing effects are present.

8. A cable modem that communicates with a cable modem termination system (CMTS) via a cable plant, the cable modem comprising:
    a cable interface configured to receive, via a downstream channel from the CMTS, a plurality of orthogonal frequency division multiplexed (OFDM) symbols of a data packet, and a physical layer link channel (PLC) message block that indicates a full OFDM symbol of the plurality of OFDM symbols; and
    a data processing module configured to capture the full OFDM symbol received via the downstream channel as capture data and wherein a location of the full OFDM symbol in the data packet is determined via a symbol select field of the PLC message block received via the downstream channel.

9. The cable modem of claim 8 wherein the data processing module is further configured to generate feedback data that includes the capture data and wherein the cable interface sends the feedback data, via an upstream channel to the CMTS, for analysis.

10. The cable modem of claim 9 wherein the analysis includes characterization of linear and nonlinear response of the downstream channel.

11. The cable modem of claim 8 wherein the capture data includes time domain data.

12. The cable modem of claim 11 wherein the time domain data includes I and Q samples of the full OFDM symbol.

13. The cable modem of claim 11 wherein the time domain data includes I and Q samples of the full OFDM symbol not including a guard interval.

14. The cable modem of claim 8 wherein the capture data includes at least a bit indicating if receiver windowing effects are present.

15. A method for use in a cable modem that communicates with a cable modem termination system (CMTS) via a cable plant, the method comprising:

receiving, via a downstream channel from the CMTS, a plurality of orthogonal frequency division multiplexed (OFDM) symbols of a data packet, and a physical layer link channel (PLC) message block that indicates a full OFDM symbol of the plurality of OFDM symbols; and capturing the full OFDM symbol received via the downstream channel as capture data and wherein the capture of the full OFDM symbol received via the downstream channel is synchronized via the PLC message block received via the downstream channel.

16. The method of claim 15 further comprising:

generating feedback data that includes the capture data; and sending the feedback data to the CMTS for analysis;

wherein the analysis includes characterization of a response of the downstream channel.

17. The method of claim 15 wherein the downstream channel is synchronized via the PLC message block based on a location of the full OFDM symbol in the data packet determined via a symbol select field of the PLC message block.

18. The method of claim 15 wherein the capture data includes I and Q samples of the full OFDM symbol.

19. The method of claim 15 wherein the capture data includes I and Q samples of the full OFDM symbol not including a guard interval.

20. The method of claim 15 wherein the capture data includes at least a bit indicating if receiver windowing effects are present.

* * * * *